(12) United States Patent
Yang et al.

(10) Patent No.: US 12,501,299 B2
(45) Date of Patent: Dec. 16, 2025

(54) BEAM REPORTING METHOD, NETWORK NODE, AND TERMINAL

(71) Applicant: VIVO MOBILE COMMUNICATION CO., LTD., Dongguan (CN)

(72) Inventors: Ang Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 467 days.

(21) Appl. No.: 17/886,624

(22) Filed: Aug. 12, 2022

(65) Prior Publication Data

US 2022/0385347 A1    Dec. 1, 2022

Related U.S. Application Data

(63) Continuation of application No. PCT/CN2021/075403, filed on Feb. 5, 2021.

(30) Foreign Application Priority Data

Feb. 12, 2020 (CN) .......................... 202010089408.6

(51) Int. Cl.
*H04W 24/10* (2009.01)
*H04W 56/00* (2009.01)

(52) U.S. Cl.
CPC ....... *H04W 24/10* (2013.01); *H04W 56/0065* (2013.01)

(58) Field of Classification Search
CPC ............................ H04B 7/0626; H04W 72/23; H04W 56/0045; H04W 24/10; H04W 24/56–0065

(Continued)

(56) References Cited

U.S. PATENT DOCUMENTS 12,127,045 B2 * 10/2024 Murray ............... H04W 56/001
2006/0052106 A1 * 3/2006 Park ................... H04W 36/0055
455/436

(Continued)

FOREIGN PATENT DOCUMENTS

CN    103108405 A    5/2013
CN    104813187 A    7/2015

(Continued)

OTHER PUBLICATIONS

"Yue et al., A Timing Advance Information Obtained, Feedback Method, Terminal And Base Station, Dec. 25, 2018, CN 109089309" (Year: 2017).*

(Continued)

*Primary Examiner* — Kevin C. Harper
(74) *Attorney, Agent, or Firm* — IPX PLLC

(57) ABSTRACT

A beam reporting method, a network node, and a terminal are provided. The beam reporting method is applied to a network node and includes: sending a channel state information report configuration to a terminal; and receiving a beam report reported by the terminal according to the channel state information report configuration, where group reporting in the channel state information report configuration is set to enable, a function of associating the beam report with a neighbor network node is activated, and the beam report is associated with a neighbor network node.

17 Claims, 8 Drawing Sheets

Send configuration information associated with a beam report to a terminal — 501

Receive a beam report reported by the terminal according to the configuration information, where the beam report carries a timing advance TA value — 502

(58) Field of Classification Search
USPC .......................................................... 370/252
See application file for complete search history.

(56) References Cited

U.S. PATENT DOCUMENTS

| | | | | |
|---|---|---|---|---|
| 2016/0195601 | A1* | 7/2016 | Siomina | G01S 5/10 |
| | | | | 455/456.1 |
| 2019/0215136 | A1 | 7/2019 | Zhou et al. | |
| 2019/0261298 | A1* | 8/2019 | Yoon | H04L 5/0053 |
| 2020/0008245 | A1* | 1/2020 | Yan | H04W 36/0072 |
| 2020/0196173 | A1* | 6/2020 | Da Silva | H04B 7/0695 |
| 2020/0228381 | A1* | 7/2020 | Manolakos | G01S 1/0428 |
| 2021/0195651 | A1* | 6/2021 | Zhang | H04B 7/0695 |
| 2022/0022269 | A1* | 1/2022 | Shi | H04W 72/044 |
| 2022/0279367 | A1* | 9/2022 | Hwang | H04L 5/0048 |
| 2022/0330347 | A1* | 10/2022 | You | H04B 7/18513 |

FOREIGN PATENT DOCUMENTS

| | | | | |
|---|---|---|---|---|
| CN | 110381531 A | 10/2019 | | |
| CN | 110521132 A | 11/2019 | | |
| CN | 110536339 A | 12/2019 | | |
| CN | 110661556 A | 1/2020 | | |
| KR | 10-2020-0127529 | * 11/2020 | ............ | H04W 64/00 |
| WO | 2011071554 A1 | 6/2011 | | |
| WO | 2019103196 A1 | 5/2019 | | |

OTHER PUBLICATIONS

"Baldemair et al., For Network Architecture, Method And Device Of Wireless Communication Network, Apr. 5, 2019, CN 109588059" (Year: 2017).*
Extended European Search Report issued in related Chinese Application No. 21753594.7, mailed Jun. 20, 2023, 12 pages.
CATT, "Discussion on the Enhancement of TA Acquisition for E-CID", 3GPP Draft, R2-124493, Oct. 2012, 4 pages.
International Search Report issued in corresponding International Application No. PCT/CN2021/075403, mailed Apr. 27, 2021, 4 pages.
Intel Corporation, "On multi-TRP/multi-panel transmission", 3GPP TSG RAN WG1 Meeting #99 R1-1912222, Nov. 22, 2019.
First Office Action issued in related Chinese Application No. 202010089408.6, mailed May 18, 2022, 11 pages.
Second Office Action issued in related Chinese Application No. 202010089408.6, mailed Nov. 3, 2022, 5 pages.

* cited by examiner

BEAM REPORTING METHOD, NETWORK NODE, AND TERMINAL

CROSS-REFERENCE TO RELATED APPLICATIONS

This application is a continuation of International Application No. PCT/CN2021/075403, filed on Feb. 5, 2021, which claims priority to Chinese Patent Application No. 202010089408.6, filed on Feb. 12, 2020. The entire contents of each of the above-identified applications are expressly incorporated herein by reference.

TECHNICAL FIELD

The present disclosure relates to the field of communications technologies, and in particular, to a beam reporting method, a network node, and a terminal.

BACKGROUND

In a case that group-based beam reporting (groupBasedBeamReporting, that is, group reporting) in Channel State Information Report Configuration (CSI-ReportConfig) is set to "enable", a beam report can be associated with only an reference signal (RS) of a current cell. In a mobility scenario or a multi-Transmission/Reception Point (Tx/Rx Point, TRP) scenario, a network sometimes hopes that UE (terminal) can communicate with a plurality of TRPs or cells, but this requirement cannot be met in the prior art.

In addition, when groupBasedBeamReporting in CSI-ReportConfig is set to "enable", the beam report must be reported according to this configuration (that is, UE must be set to "enable" according to groupBasedBeamReporting), that is, beam quality of a plurality of RSs that can be received at the same time is reported. However, in many cases, when a plurality of RSs are received at the same time, beams represented by two RSs interfere with each other, and it is not as good as receiving a beam represented by one RS. This reduces efficiency.

In addition, a Layer 1 (L1) beam report cannot carry Timing Advance (TA) information, and a Layer 3 (L3) beam report can only carry TA information in some cases. However, in a mobility scenario or a multi-TRP scenario, a network needs to quickly obtain TA information of UE and different cells.

SUMMARY

Embodiments of the present disclosure provide a beam reporting method, a network node, and a terminal.

According to a first aspect, an embodiment of the present disclosure provides a beam reporting method, applied to a network node and including:
  sending a channel state information report configuration to a terminal; and
  receiving a beam report reported by the terminal according to the channel state information report configuration, where
  group reporting in the channel state information report configuration is set to enable, a function of associating the beam report with a neighbor network node is activated, and the beam report is associated with a neighbor network node.

According to a second aspect, an embodiment of the present disclosure further provides a beam reporting method, applied to a terminal and including:
  receiving a channel state information report configuration sent by a network node; and
  reporting a beam report to the network node according to the channel state information report configuration, where
  group reporting in the channel state information report configuration is set to enable, a function of associating the beam report with a neighbor network node is activated, and the beam report is associated with a neighbor network node.

According to a third aspect, an embodiment of the present disclosure further provides a beam reporting method, applied to a network node and including:
  sending a channel state information report configuration to a terminal, and
  receiving a beam report reported by the terminal according to the channel state information report configuration, where
  group reporting in the channel state information report configuration is set to enable, and the terminal determines, through at least one of default setting and second signaling sent by the network node, whether to report the beam report according to a case that group reporting is set to disable.

According to a fourth aspect, an embodiment of the present disclosure further provides a beam reporting method, applied to a terminal and including:
  receiving a channel state information report configuration sent by a network node; and
  reporting a beam report to the network node according to the channel state information report configuration, where
  group reporting in the channel state information report configuration is set to enable, and the terminal determines, through at least one of default setting and second signaling sent by the network node, whether to report the beam report according to a case that group reporting is set to disable.

According to a fifth aspect, an embodiment of the present disclosure further provides a beam reporting method, applied to a network node and including:
  sending configuration information associated with a beam report to a terminal; and
  receiving a beam report reported by the terminal according to the configuration information, where
  the beam report carries a timing advance TA value.

According to a sixth aspect, an embodiment of the present disclosure further provides a beam reporting method, applied to a terminal and including:
  receiving configuration information that is associated with a beam report and that is sent by a network node; and
  reporting a beam report to the network node according to the configuration information, where
  the beam report carries a timing advance TA value.

According to a seventh aspect, an embodiment of the present disclosure further provides a network node, including:
  a first sending module, configured to send a channel state information report configuration to a terminal; and
  a first receiving module, configured to receive a beam report reported by the terminal according to the channel state information report configuration, where
  group reporting in the channel state information report configuration is set to enable, a function of associating the beam report with a neighbor network node is activated, and the beam report is associated with a neighbor network node.

According to an eighth aspect, an embodiment of the present disclosure further provides a terminal, including:
a second receiving module, configured to receive a channel state information report configuration sent by a network node; and
a first reporting module, configured to report a beam report to the network node according to the channel state information report configuration, where
group reporting in the channel state information report configuration is set to enable, a function of associating the beam report with a neighbor network node is activated, and the beam report is associated with a neighbor network node.

According to a ninth aspect, an embodiment of the present disclosure further provides a network node, including:
a second sending module, configured to send a channel state information report configuration to a terminal; and
a third receiving module, configured to receive a beam report reported by the terminal according to the channel state information report configuration, where
group reporting in the channel state information report configuration is set to enable, and the terminal determines, through at least one of default setting and second signaling sent by the network node, whether to report the beam report according to a case that group reporting is set to disable.

According to a tenth aspect, an embodiment of the present disclosure further provides a terminal, including:
a fourth receiving module, configured to receive a channel state information report configuration sent by a network node; and
a second reporting module, configured to report a beam report to the network node according to the channel state information report configuration, where
group reporting in the channel state information report configuration is set to enable, and the terminal determines, through at least one of default setting and second signaling sent by the network node, whether to report the beam report according to a case that group reporting is set to disable.

According to an eleventh aspect, an embodiment of the present disclosure further provides a network node, including:
a third sending module, configured to send configuration information associated with a beam report to a terminal; and
a fifth receiving module, configured to receive a beam report reported by the terminal according to the configuration information, where
the beam report carries a timing advance TA value.

According to a twelfth aspect, an embodiment of the present disclosure further provides a terminal, including:
a sixth receiving module, configured to receive configuration information that is associated with a beam report and that is sent by a network node; and
a third reporting module, configured to report a beam report to the network node according to the configuration information, where
the beam report carries a timing advance TA value.

According to a thirteenth aspect, an embodiment of the present disclosure further provide a network node, including a memory, a processor, and a computer program that is stored in the memory and that can be run on the processor, where when the computer program is executed by the processor, the steps of the foregoing beam reporting method on the network node side are implemented.

According to a fourteenth aspect, an embodiment of the present disclosure further provide a terminal, including a memory, a processor, and a computer program that is stored in the memory and that can be run on the processor, where when the computer program is executed by the processor, the steps of the foregoing beam reporting method on the terminal side are implemented.

According to a fifteenth aspect, an embodiment of the present disclosure further provides a computer-readable storage medium, where the computer-readable storage medium stores a computer program, and when the computer program is executed by a processor, the steps of the foregoing beam reporting method on the network node side or the terminal side are implemented.

DETAILED DESCRIPTION

The following describes the present disclosure in detail with reference to the accompanying drawings and specific embodiments.

The following terms are first described as follows:

A neighbor network node includes a neighbor Transmission/Reception Point (Tx/Rx Point, TRP) and/or a neighbor cell.

A network node includes a (current) TRP and/or a (current) cell.

Identifier information of a neighbor network node includes a Transmission/Reception Point IDentifier (TRP ID) of a neighbor TRP or a Physical Cell Identifier (PCI) or a cell IDentifier (cell ID) of a neighbor cell. Correspondingly, identifier related information of a neighbor network node includes TRP ID-related information, or PCI-related information or cell ID-related information of a neighbor cell.

Beam quality includes a SIgnal-to-Noise Ratio (SINR) and/or Reference Signal Received Power (RSRP) and/or Reference Signal Received Quality (RSRQ).

Identifier information of a network node includes a PCI, a cell ID, or a TRP ID of a cell. Correspondingly, identifier related information of a network node includes PCI-related information, cell ID-related information, or TRP ID-related information of a cell.

Figure 1:
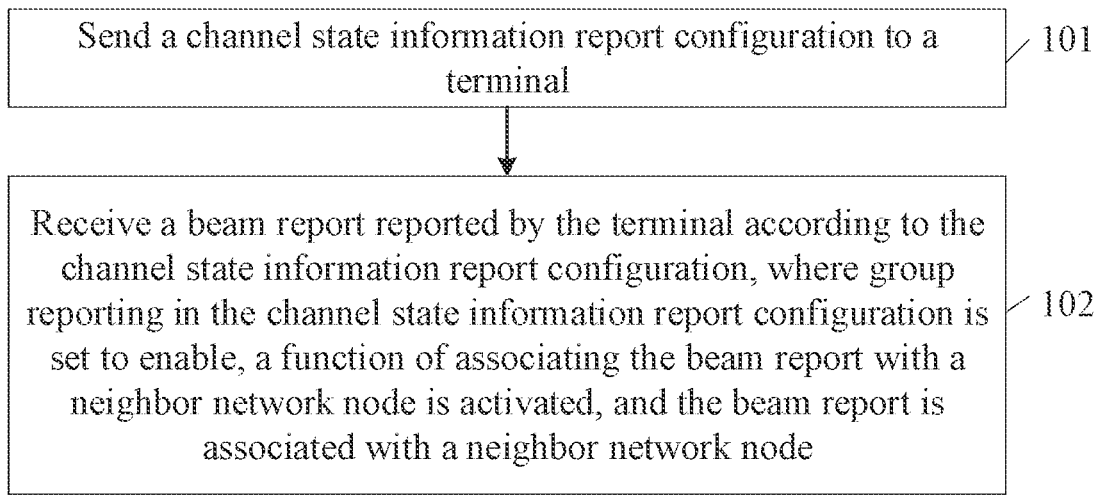
FIG. 1 is a first schematic diagram of a beam reporting method according to an embodiment of the present disclosure.

An embodiment of the present disclosure provides a beam reporting method, applied to a network node. As shown in FIG. 1, the method includes the following steps.

Step 101: Send a channel state information report configuration to a terminal.

Step 102: Receive a beam report reported by the terminal according to the channel state information report configuration, where group reporting in the channel state information report configuration is set to enable, a function of associating the beam report with a neighbor network node is activated, and the beam report is associated with a neighbor network node.

In this embodiment of the present disclosure, the function is activated in at least one of the following manners:

the function is activated by default;

the network node configures first signaling; and the network node updates content of the first signaling.

For a case that the network node configures the first signaling, the first signaling may be configured to enable or disable. However, this is not limited thereto. The first signaling is signaling related to activating the function. In some embodiments, the first signaling is additional added signaling, and may be at least one of signaling such as a Media Access Control Control Element (MAC CE), Radio Resource Control (RRC), and downlink control information (DCI).

In some embodiments, the associating the beam report with a neighbor network node is indicated by the network node to the terminal in a first association manner; and the first association manner includes at least one of the following manners: the network node configures first higher layer signaling; the network node configures at least one of identifier information and identifier related information of a neighbor network node; the network node activates at least one of the identifier information and the identifier related information of the neighbor network node; and the network node updates at least one of the identifier information and the identifier related information of the neighbor network node.

UE may learn of a neighbor network node by using content of the first higher layer signaling, configuration information, and the like. In some embodiments, the first higher layer signaling is additional added signaling, and may be at least one of higher layer signaling such as MAC CE and RRC. The first higher layer signaling herein may also be replaced with first lower layer signaling, and the first lower layer signaling may be at least one of signaling such as DCI.

The identifier related information is sent by using at least one of the following signaling: higher layer signaling; and physical layer signaling.

In this embodiment of the present disclosure, the higher layer signaling includes at least one of the following: a cell group configuration, a special cell configuration, a synchronous reconfiguration, a serving cell common configuration, and a serving cell configuration.

The physical layer signaling includes at least one of the following: a channel state information measurement configuration, a channel state information report configuration, a channel state information resource configuration, a non-zero power channel state information-reference signal resource set, a non-zero power channel state information-reference signal resource, a channel state information synchronization signal block resource set, a channel sounding reference signal configuration, a channel sounding reference signal resource set, a sounding reference signal resource, a physical downlink control channel configuration, a physical downlink shared channel configuration, a physical uplink control channel configuration, and a physical uplink shared channel configuration.

In this embodiment of the present disclosure, reference signals RSs reported in the beam report are RSs belonging to different network nodes.

A maximum of N RSs are reported for each network node, or N RSs are reported for each network node; and N is determined through at least one of default setting, a network configuration, and terminal reporting.

In some embodiments, N=1, or N>1; where if N>1, at least one of a reporting sequence and reporting priorities of N RSs in the beam report is determined according to at least one of the following rules: being determined according to a reference signal identifier; being determined according to an RS type; being determined according to beam quality; and being determined through at least one of a network configuration, default setting, and terminal determination.

In this embodiment of the present disclosure, the beam report carries at least one of identifier information and identifier related information of a network node.

At least one of a reporting sequence and reporting priorities of RSs in the beam report is determined according to at least one of the following rules: a reporting priority of an RS of a current network node is higher than a reporting priority of an RS of a neighbor network node; and if there are a plurality of neighbor network nodes, at least one of a reporting sequence and reporting priorities of RSs between neighbor network nodes is determined through at least one of a network configuration, default setting, and terminal reporting.

A premise for determining the reporting sequence and/or the reporting priorities by using the foregoing rule is: the beam report does not carry first information; or the beam report carries first information, where the first information includes at least one of identifier information and identifier related information of a network node.

In some embodiments, at least one of the reporting sequence and the reporting priorities of the RSs between the neighbor network nodes is determined according to at least one of the following rules: beam quality, cell quality, and network node quality; identifier information and identifier related information of a neighbor network node; a physical distance between a neighbor network node and a current network node; and a physical location of a neighbor network node.

According to the beam reporting method provided in this embodiment of the present disclosure, a channel state information report configuration is sent to a terminal; and a beam report reported by the terminal according to the channel state information report configuration is received, where group reporting in the channel state information report configuration is set to enable, a function of associating the beam report with a neighbor network node is activated, and the beam report is associated with a neighbor network node. In this way, in addition to being associated with an RS of a current network node, the beam report can be associated with an RS of another network node, so that a problem in the prior art that the beam report can be associated with only an RS of a current cell can be resolved.

Figure 2:
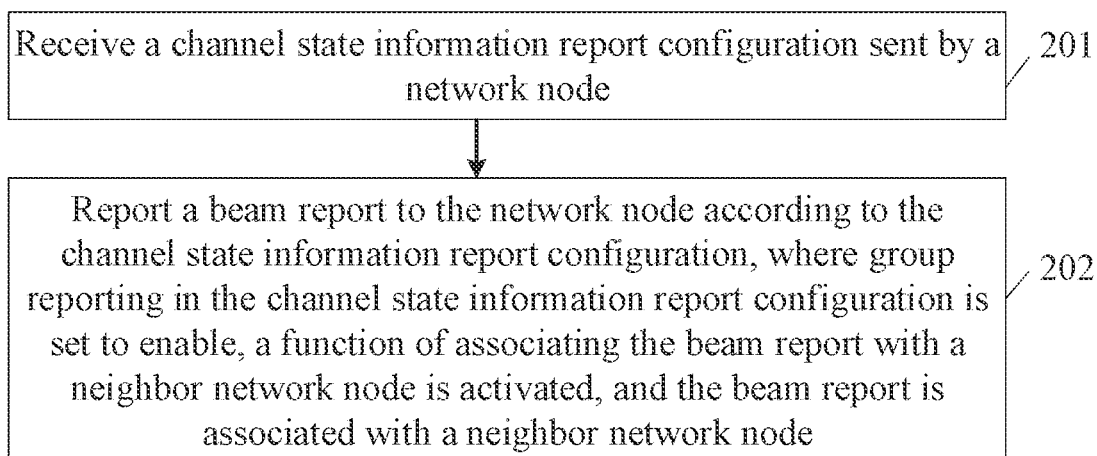
FIG. 2 is a second schematic diagram of a beam reporting method according to an embodiment of the present disclosure.

An embodiment of the present disclosure further provides a beam reporting method, applied to a terminal. As shown in FIG. 2, the method includes the following steps.

Step 201: Receive a channel state information report configuration sent by a network node.

Step 202: Report a beam report to the network node according to the channel state information report configuration, where group reporting in the channel state information report configuration is set to enable, a function of associating the beam report with a neighbor network node is activated, and the beam report is associated with a neighbor network node.

In this embodiment of the present disclosure, the function is activated in at least one of the following manners:
the function is activated by default;
the network node configures first signaling; and
the network node updates content of the first signaling.

For a case that the network node configures the first signaling, the first signaling may be configured to enable or disable. However, this is not limited thereto. The first signaling is signaling related to activating the function. In some embodiments, the first signaling is additional added signaling, and may be at least one of signaling such as a Media Access Control Control Element (MAC CE), Radio Resource Control (RRC), and Downlink Control Information (DCI).

In some embodiments, the associating the beam report with a neighbor network node is indicated by the network node to the terminal in a first association manner; and the first association manner includes at least one of the following manners: the network node configures first higher layer signaling; the network node configures at least one of identifier information and identifier related information of a neighbor network node; the network node activates at least one of the identifier information and the identifier related information of the neighbor network node; and the network node updates at least one of the identifier information and the identifier related information of the neighbor network node.

UE may learn of a neighbor network node by using content of the first higher layer signaling, configuration information, and the like. In some embodiments, the first higher layer signaling is additional added signaling, and may be at least one of higher layer signaling such as a MAC CE and RRC. The first higher layer signaling herein may also be replaced with first lower layer signaling, and the first lower layer signaling may be at least one of signaling such as DCI.

The identifier related information is sent by using at least one of the following signaling: higher layer signaling; and physical layer signaling.

In this embodiment of the present disclosure, the higher layer signaling includes at least one of the following: a cell group configuration, a special cell configuration, a synchronous reconfiguration, a serving cell common configuration, and a serving cell configuration.

The physical layer signaling includes at least one of the following: a channel state information measurement configuration, a channel state information report configuration, a channel state information resource configuration, a non-zero power channel state information-reference signal resource set, a non-zero power channel state information-reference signal resource, a channel state information synchronization signal block resource set, a channel sounding reference signal configuration, a channel sounding reference signal resource set, a sounding reference signal resource, a physical downlink control channel configuration, a physical downlink shared channel configuration, a physical uplink control channel configuration, and a physical uplink shared channel configuration.

In this embodiment of the present disclosure, Reference Signals (RSs) reported in the beam report are RSs belonging to different network nodes.

A maximum of N RSs are reported for each network node, or N RSs are reported for each network node; and N is determined through at least one of default setting, a network configuration, and terminal reporting.

In some embodiments, N=1, or N>1; where if N>1, at least one of a reporting sequence and reporting priorities of N RSs in the beam report is determined according to at least one of the following rules: being determined according to a reference signal identifier; being determined according to an RS type; being determined according to beam quality; and being determined through at least one of a network configuration, default setting, and terminal determination.

In this embodiment of the present disclosure, the beam report carries at least one of identifier information and identifier related information of a network node.

At least one of a reporting sequence and reporting priorities of RSs in the beam report is determined according to at least one of the following rules: a reporting priority of an RS of a current network node is higher than a reporting priority of an RS of a neighbor network node; and if there are a plurality of neighbor network nodes, at least one of a reporting sequence and reporting priorities of RSs between neighbor network nodes is determined through at least one of a network configuration, default setting, and terminal reporting.

A premise for determining the reporting sequence and/or the reporting priorities by using the foregoing rule is; the beam report does not carry first information; or the beam report carries first information, where the first information includes at least one of identifier information and identifier related information of a network node.

In some embodiments, at least one of the reporting sequence and the reporting priorities of the RSs between the neighbor network nodes is determined according to at least one of the following rules: beam quality, cell quality, and network node quality; identifier information and identifier related information of a neighbor network node; a physical distance between a neighbor network node and a current network node; and a physical location of a neighbor network node.

According to the beam reporting method provided in this embodiment of the present disclosure, a channel state information report configuration sent by a network node is received; and a beam report is reported to the network node according to the channel state information report configuration, where group reporting in the channel state information report configuration is set to enable, a function of associating the beam report with a neighbor network node is activated, and the beam report is associated with a neighbor network node. In this way, in addition to being associated with an RS of a current network node, the beam report can be associated with an RS of another network node, so that a problem in the prior art that the beam report can be associated with only an RS of a current cell can be resolved.

Figure 3:
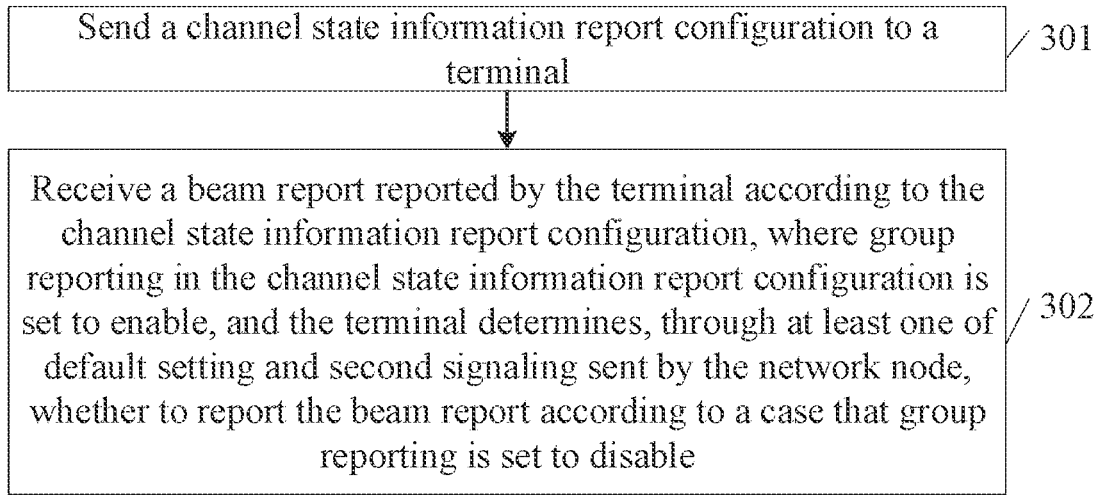
FIG. 3 is a third schematic diagram of a beam reporting method according to an embodiment of the present disclosure.

An embodiment of the present disclosure further provides a beam reporting method, applied to a network node. As shown in FIG. 3, the method includes the following steps.

Step 301: Send a channel state information report configuration to a terminal.

Step 302: Receive a beam report reported by the terminal according to the channel state information report configuration, where group reporting in the channel state information report configuration is set to enable, and the terminal determines, through at least one of default setting and second signaling sent by the network node, whether to report the beam report according to a case that group reporting is set to disable.

The second signaling is signaling related to "the terminal determines whether to report the beam report according to a case that group reporting is set to disable". In some embodiments, the second signaling is additional added signaling, and may be at least one of signaling such as a MAC CE, RRC, and DCI.

Further, the beam reporting method further includes: determining a beam selection result of the terminal in at least one of the following manners: being determined by using at least one of payloads or overheads of the beam report, and the number of to-be-reported reference signals RSs; being determined by using indication information carried in the beam report; and being determined based on a case that all RSs in the beam report are RSs of one network node, or the beam report does not carry at least one of identifier information and identifier related information of a network node; or when the beam report is associated with a neighbor network node, RSs reported in the beam report are RSs belonging to different network nodes, or all RSs reported in the beam report are RSs of one network node.

An occupied bit of the indication information is 1 bit, an indication value 0 of the bit indicates that the terminal reports the beam report according to a case that group reporting is set to enable, and an indication value 1 of the bit indicates that the terminal reports the beam report according to a case that group reporting is set to disable, or an indication value 0 of the bit indicates that the terminal reports the beam report according to a case that group reporting is set to disable, and an indication value 1 of the bit indicates that the terminal reports the beam report according to a case that group reporting is set to enable.

According to the beam reporting method provided in this embodiment of the present disclosure, a channel state information report configuration is sent to a terminal; and a beam report reported by the terminal according to the channel state information report configuration is received, where group reporting in the channel state information report configuration is set to enable, and the terminal determines, through at least one of default setting and second signaling sent by the network node, whether to report the beam report according to a case that group reporting is set to disable. In this way, in a case that group reporting is set to enable, UE can autonomously determine whether to report a beam report according to a case that group reporting is set to disable, so that a problem in the prior art that the UE must perform beam reporting according to setting of groupBasedBeamReporting is resolved.

Figure 4:
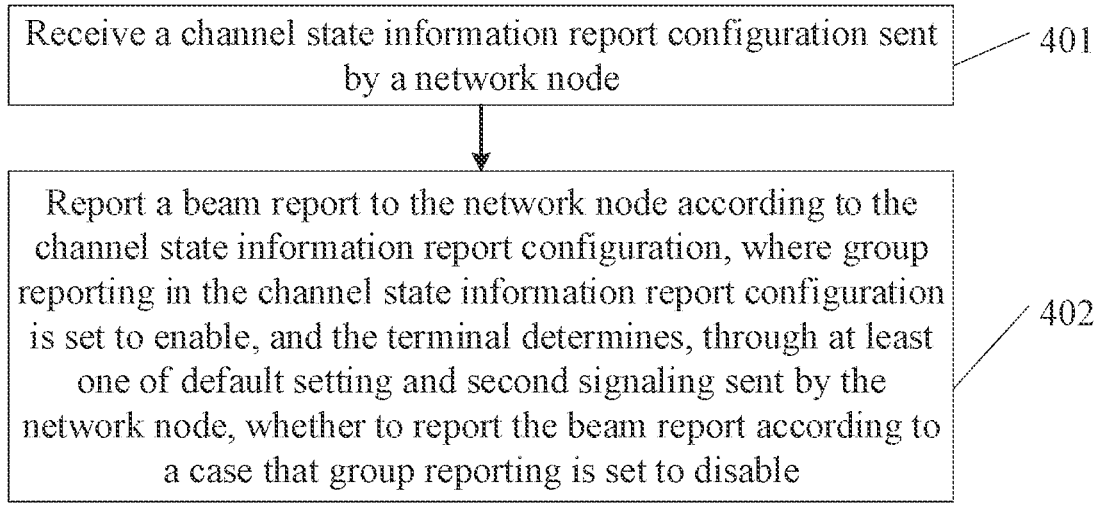
FIG. 4 is a fourth schematic diagram of a beam reporting method according to an embodiment of the present disclosure.

An embodiment of the present disclosure further provides a beam reporting method, applied to a terminal. As shown in FIG. 4, the method includes the following steps.

Step 401: Receive a channel state information report configuration sent by a network node.

Step 402: Report a beam report to the network node according to the channel state information report configuration, where group reporting in the channel state information report configuration is set to enable, and the terminal determines, through at least one of default setting and second signaling sent by the network node, whether to report the beam report according to a case that group reporting is set to disable.

The second signaling is signaling related to "the terminal determines whether to report the beam report according to a case that group reporting is set to disable". In some embodiments, the second signaling is additional added signaling, and may be at least one of signaling such as a MAC CE, RRC, and DCI.

Further, the beam reporting method further includes: notifying the network node of a beam selection result of the terminal in at least one of the following manners: being notified by using at least one of payloads or overheads of the beam report, and the number of to-be-reported RSs; being notified by using indication information carried in the beam report; and being notified based on a case that all RSs in the beam report are RSs of one network node, or the beam report does not carry at least one of identifier information and identifier related information of a network node; or when the beam report is associated with a neighbor network node, RSs reported in the beam report are RSs belonging to different network nodes, or all RSs reported in the beam report are RSs of one network node.

An occupied bit of the indication information is 1 bit, an indication value 0 of the bit indicates that the terminal reports the beam report according to a case that group reporting is set to enable, and an indication value 1 of the bit indicates that the terminal reports the beam report according to a case that group reporting is set to disable, or an indication value 0 of the bit indicates that the terminal reports the beam report according to a case that group reporting is set to disable, and an indication value 1 of the bit indicates that the terminal reports the beam report according to a case that group reporting is set to enable.

According to the beam reporting method provided in this embodiment of the present disclosure, a channel state information report configuration sent by a network node is received; and a beam report is reported to the network node according to the channel state information report configuration is received, where group reporting in the channel state information report configuration is set to enable, and the terminal determines, through at least one of default setting and second signaling sent by the network node, whether to report the beam report according to a case that group reporting is set to disable. In this way, in a case that group reporting is set to enable, UE can autonomously determine whether to report a beam report according to a case that group reporting is set to disable, so that a problem in the prior art that the UE must perform beam reporting according to setting of groupBasedBeamReporting is resolved.

Figure 5:
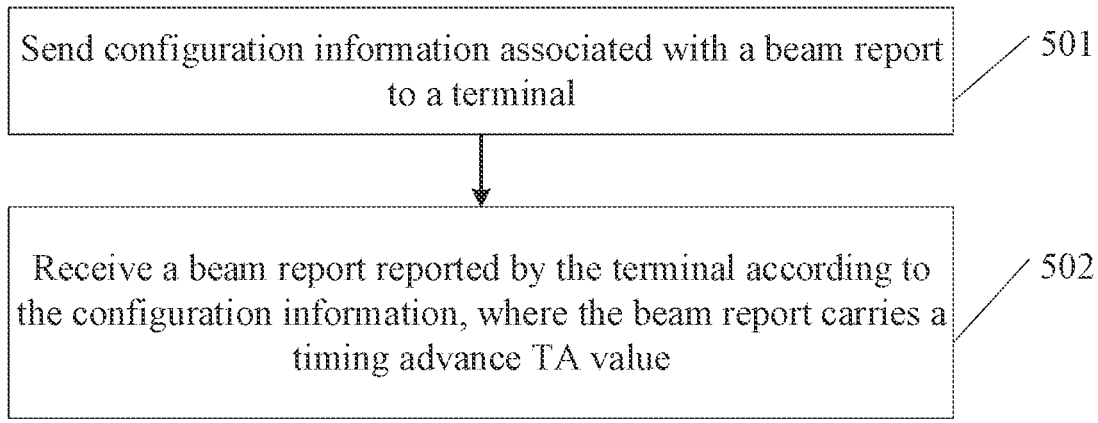
FIG. 5 is a fifth schematic diagram of a beam reporting method according to an embodiment of the present disclosure.

An embodiment of the present disclosure further provides a beam reporting method, applied to a network node. As shown in FIG. 5, the method includes the following steps.

Step 501: Send configuration information associated with a beam report to a terminal.

Step 502: Receive a beam report reported by the terminal according to the configuration information, where the beam report carries a Timing Advance (TA) value.

The beam report may include an L1 report, an L3 report, and/or a higher layer report.

In this embodiment of the present disclosure, a layer 1 beam report in the beam report carries a TA value, where the layer 1 beam report is associated with a neighbor network node, or the configuration information is associated with a neighbor network node; and in the configuration information, at least one of identifier information and identifier related information of a neighbor network node is processed in at least one of the following manners: being configured by the network node; being activated by the network node; and being updated by the network node.

Signaling in which the identifier related information is located includes at least one of higher layer signaling and physical layer signaling.

In some embodiments, the higher layer signaling includes at least one of the following: a cell group configuration, a special cell configuration, a synchronous reconfiguration, a serving cell common configuration, and a serving cell configuration.

The physical layer signaling includes at least one of the following: a channel state information measurement configuration, a channel state information report configuration, a channel state information resource configuration, a non-zero power channel state information-reference signal resource set, a non-zero power channel state information-reference signal resource, a channel state information synchronization signal block resource set, a channel sounding reference signal configuration, a channel sounding reference signal resource set, a sounding reference signal resource, a physical downlink control channel configuration, a physical downlink shared channel configuration, a physical uplink control channel configuration, and a physical uplink shared channel configuration.

In this embodiment of the present disclosure, at least one of a layer 3 beam report and a higher layer report in the beam report carries a TA value in a case of dual connectivity or in a case of non-dual connectivity.

In the configuration information, configured third signaling is enabled or disabled, or third signaling is configured or third signaling is not configured.

The third signaling is signaling related to the precondition "the beam report carries a TA value". In some embodiments, "the beam report carries a TA value" needs to be performed when the foregoing limitation on the third signaling is met. In some embodiments, the third signaling is additional added signaling, and may be at least one of signaling such as a MAC CE, RRC, and DCI.

In this embodiment of the present disclosure, that the beam report carries a timing advance TA value includes: the beam report carries at least one of timing and a TA value of a neighbor network node, or carries at least one of a difference between timing of the neighbor network node and timing of a current network node, and a difference between a TA value of the neighbor network node and a TA value of the current network node.

A value range corresponding to the TA value or the difference is indicated by a first bit group, and a value indicated by the first bit group is a default value or is configured by a network; and the first bit group includes at least one bit.

For example, the value range corresponding to the TA value and/or the difference may be represented by 2 bits, for example, 00 indicates that the value range of the TA value and/or the difference is N0 to N1 milliseconds, and 01 indicates that the value range of the TA value and/or the difference is N1 to N2. However, this is not limited thereto.

In this embodiment of the present disclosure, the TA value or the difference is reported only when at least one of the following reporting conditions is met: the TA value or the difference is less than a first threshold; the TA value or the difference is greater than a second threshold; and the TA value or the difference is greater than a third threshold and less than a fourth threshold, where specific values of the first threshold, the second threshold, the third threshold, and the fourth threshold, and a specific reporting condition of the TA value or the difference value are determined through default setting or a network configuration, or determined by the terminal.

The TA value may be reported together with at least one of the following information: at least one of a reference signal identifier and beam quality; at least one of identifier information and identifier related information of a network node; and at least one of identifier information and identifier related information of an antenna panel.

According to the beam reporting method provided in this embodiment of the present disclosure, configuration information associated with a beam report is sent to a terminal; and a beam report reported by the terminal according to the configuration information is received, where the beam report carries a timing advance TA value. In this way, a network can quickly obtain TA information of UE and different cells, so that a problem in the prior art that the network cannot quickly obtain TA information of UE and different cells can be resolved.

Figure 6:
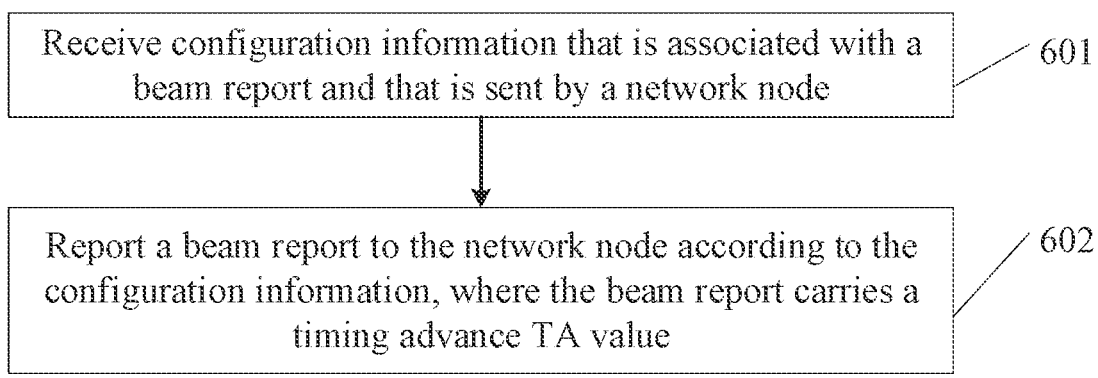
FIG. 6 is a sixth schematic diagram of a beam reporting method according to an embodiment of the present disclosure.

An embodiment of the present disclosure further provides a beam reporting method, applied to a terminal. As shown in FIG. 6, the method includes the following steps.

Step 601: Receive configuration information that is associated with a beam report and that is sent by a network node.

Step 602: Report a beam report to the network node according to the configuration information, where the beam report carries a TA value.

The beam report may include an L1 report, an L3 report, and/or a higher layer report.

In this embodiment of the present disclosure, a layer 1 beam report in the beam report carries a TA value, where the layer 1 beam report is associated with a neighbor network node, or the configuration information is associated with a neighbor network node; and in the configuration information, at least one of identifier information and identifier related information of a neighbor network node is processed in at least one of the following manners: being configured by the network node; being activated by the network node; and being updated by the network node.

Signaling in which the identifier related information is located includes at least one of higher layer signaling and physical layer signaling.

In some embodiments, the higher layer signaling includes at least one of the following: a cell group configuration, a special cell configuration, a synchronous reconfiguration, a serving cell common configuration, and a serving cell configuration.

The physical layer signaling includes at least one of the following: a channel state information measurement configuration, a channel state information report configuration, a channel state information resource configuration, a non-zero power channel state information-reference signal resource set, a non-zero power channel state information-reference signal resource, a channel state information synchronization signal block resource set, a channel sounding reference signal configuration, a channel sounding reference signal resource set, a sounding reference signal resource, a physical downlink control channel configuration, a physical downlink shared channel configuration, a physical uplink control channel configuration, and a physical uplink shared channel configuration.

In this embodiment of the present disclosure, at least one of a layer 3 beam report and a higher layer report in the beam report carries a TA value in a case of dual connectivity or in a case of non-dual connectivity.

In the configuration information, configured third signaling is enabled or disabled, or third signaling is configured or third signaling is not configured.

The third signaling is signaling related to the precondition "the beam report carries a TA value". In some embodiments, "the beam report carries a TA value" needs to be performed when the foregoing limitation on the third signaling is met. In some embodiments, the third signaling is additional added signaling, and may be at least one of signaling such as a MAC CE, RRC, and DCI.

In this embodiment of the present disclosure, that the beam report carries a timing advance TA value includes: the beam report carries at least one of timing and a TA value of a neighbor network node, or carries at least one of a difference between timing of the neighbor network node and timing of a current network node, and a difference between a TA value of the neighbor network node and a TA value of the current network node.

A value range corresponding to the TA value or the difference is indicated by a first bit group, and a value indicated by the first bit group is a default value or is configured by a network; and the first bit group includes at least one bit.

For example, the value range corresponding to the TA value and/or the difference may be represented by 2 bits, for example, 00 indicates that the value range of the TA value and/or the difference is N0 to N1 milliseconds, and 01 indicates that the value range of the TA value and/or the difference is N1 to N2. However, this is not limited thereto.

In this embodiment of the present disclosure, the TA value or the difference is reported only when at least one of the following reporting conditions is met: the TA value or the difference is less than a first threshold; the TA value or the difference is greater than a second threshold; and the TA value or the difference is greater than a third threshold and less than a fourth threshold, where specific values of the first threshold, the second threshold, the third threshold, and the fourth threshold, and a specific reporting condition of the TA value or the difference value are determined through default setting or a network configuration, or determined by the terminal.

The TA value may be reported together with at least one of the following information: at least one of a reference signal identifier and beam quality; at least one of identifier information and identifier related information of a network node; and at least one of identifier information and identifier related information of an antenna panel.

According to the beam reporting method provided in this embodiment of the present disclosure, configuration information that is associated with a beam report and that is sent by a network node is received; and a beam report is reported to the network node according to the configuration information, where the beam report carries a timing advance TA value. In this way, a network can quickly obtain TA information of UE and different cells, so that a problem in the prior art that the network cannot quickly obtain TA information of UE and different cells can be resolved.

The following further describes, with reference to both a network node and a terminal, the beam reporting method provided in the embodiments of the present disclosure. For example, the network node is a cell or a TRP, and correspondingly, a neighbor network node is a neighbor cell or a neighbor TRP.

For the foregoing technical problem, an embodiment of the present disclosure provides a beam reporting method, which may be implemented as the following three examples:

Example 1

In a case that groupBasedBeamReporting (group reporting) in CSI-ReportConfig (is set to "enable", a beam report is associated with a neighbor TRP or a neighbor cell.

1. An association manner is at least one of the following:
   (a) A network is configured with higher layer signaling (which may be understood as activating a function of associating the beam report with the neighbor TRP or the neighbor cell).
   (b) The network configures and/or activates and/or updates a PCI, PCI related information, a cell ID, cell ID-related information of the neighbor cell, a TRP ID, or TRP ID-related information of the neighbor TRP.

Signaling in which related information is located is at least one of the following:
   (1) higher layer signaling: cell group configuration (CellGroupConfig), special cell configuration (SpCellConfig), synchronous reconfiguration (ReconfigurationWithSync), serving cell common configuration (ServingCellConfigCommon), serving cell configuration (ServingCellConfig), and associated signaling thereof; and
   (2) physical layer signaling: CSI-measurement configuration (CSI-MeasConfig), CSI-report configuration (CSI-ReportConfig), CSI-resource configuration (CSI-ResourceConfig), non-zero power CSI-RS resource set (NZP-CSI-RS-ResourceSet), non-zero power CSI-RS resource (NZP-CSI-RS-Resource), CSI-synchronization block-resource set (CSI-SSB-ResourceSet), channel sounding reference signal configuration (SRS-Config), SRS-resource set (SRS-ResourceSet), SRS-resource (SRS-Resource), physical downlink control channel-configuration (PDCCH-Config), physical downlink shared channel-configuration (PDSCH-Config), physical uplink control channel-configuration (PUCCH-Config), physical uplink shared channel-configuration (PUSCH-Config), and associated signaling thereof.

2. After signaling (that is, the first signaling) is configured by default and/or by a network, RSs reported in the beam report must be RSs belonging to different cells or TRPs.
   (a) For each cell or TRP, a maximum of N RSs are reported or N RSs are reported.

N is determined through default setting and/or network configuration and/or UE reporting.

In some embodiments, N=1; or N>1.

If N>1, in the beam report, a reporting sequence and/or reporting priorities of the N RSs are determined according to at least one of the following rules:
(1) Reference Signal IDentifier (RS ID);
(2) RS type (for example, an SSB, a CSI-RS, or an SRS is reported);
(3) beam quality (for example, a SIgnal-to-Noise Ratio (SINR) and/or Reference Signal Received Power (RSRP) and/or Reference Signal Received Quality (RSRQ)); and
(4) network configuration and/or default setting and/or UE selection.
(b) The Beam report carries a PCI or PCI-related information, a cell ID or cell ID-related information, or a TRP ID or TRP ID-related information of a cell.
(c) The beam report may also not carry the foregoing cell ID, cell ID-related information, TRP ID, or TRP ID-related information.
(1) An RS of a current TRP and/or a current cell is reported, and/or
(2) If there are a plurality of neighbor cells and/or TRPs, a reporting sequence and/or priorities between the neighbor cells and/or the neighbor TRPs are determined through network configuration and/or default setting and/or UE reporting.

A parameter based on which the foregoing reporting sequence and/or priorities are determined includes at least one of the following:
Beam quality and/or cell quality and/or TRP quality (for example, an SINR and/or RSRP and/or RSRQ);
a PCI or PCI-related information, or a cell ID or cell ID-related information of a neighbor cell;
a physical distance between a neighbor cell and a current cell;
an ID of a neighbor TRP or ID-related information of a neighbor TRP, for example, the ID of the neighbor TRP is control resource set pool index (CORESETPoolIndex);
a physical distance between a current TRP and a neighbor TRP;
a physical location of a neighbor cell; and
a physical location of a neighbor TRP.

Example 2

In a case that groupBasedBeamReporting in CSI-ReportConfig is set to "enable", after signaling (that is, the foregoing second signaling) is configured by default and/or by a network, UE may select whether to perform reporting according to a case that groupBasedBeamReporting is set to "disable".

In some embodiments, the UE notifies the network of a beam selection result of the UE in at least one of the following manners:
(a) The network learns by using payloads and/or overheads of a beam report and the number of to-be-reported RSs, and the UE does not need to perform additional notification.
(b) The beam report carries indication information.

In some embodiments, an occupied bit of the indication information may be 1 bit, and an indication value: 0 indicates that the terminal performs beam report reporting according to a case that groupBasedBeamReporting is set to enable, 1 indicates that the terminal performs beam report reporting according to a case that groupBasedBeamReporting is set to disable, or 0 indicates that the terminal performs beam report reporting according to a case that groupBasedBeamReporting is set to disable, and 1 indicates that the terminal performs beam report reporting according to a case that groupBasedBeamReporting is set to enable.
(c) All RSs in the beam report are RSs of one TRP or one cell (not including another TRP or cell); or
the Beam report does not carry a TRP ID or TRP ID-related information, or does not carry a cell ID or cell ID-related information; or
when the beam report is associated with a neighbor TRP or a neighbor cell, after signaling (similar to fourth signaling of the foregoing first signaling) is configured by default and/or by the network, RSs reported in the beam report are RSs belonging to different cells and/or TRPs, or all are RSs of one cell and/or TRP.

Example 3

A beam report (L1 report and/or L3 report and/or higher layer report) carries a Timing Advance (TA) value.
1. Prerequisites:
(a) The L1 report is associated with a neighbor cell or a neighbor TRP.

In configuration information associated with the beam report, a network configures and/or activates and/or updates a PCI or PCI-related information, or a cell ID or cell ID-related information of a neighbor cell, or a TRP ID or TRP ID-related information of a neighbor TRP.

Signaling in which related information is located is at least one of the following:
higher layer signaling: CellGroupConfig, SpCellConfig, ReconfigurationWithSync, ServingCellConfigCommon, ServingCellConfig, and associated signaling thereof; and
physical layer signaling: CSI-MeasConfig, CSI-ReportConfig, CSI-ResourceConfig, NZP-CSI-RS-ResourceSet, NZP-CSI-RS-Resource, CSI-SSB-ResourceSet, SRS-Config, SRS-Config, SRS-ResourceSet, SRS-Resource, PDCCH-Config, PDSCH-Config, PUCCH-Config, PUSCH-Config, and associated signaling thereof.
(b) The L3 report and/or the higher layer report may carry a TA value in the case of Dual Connectivity (DC).
(c) In configuration information associated with the beam report, the network configures signaling (that is, the third signaling) as enable or disable, or configures signaling or does not configure signaling.
2. The beam report carries a timing and/or a TA value of a neighbor cell or a neighbor TRP, or a timing difference and/or a TA difference between a neighbor cell or a neighbor TRP and a current cell.
(a) The TA value or the foregoing difference may be not a specific value, but a range indication. For example, the TA value or the foregoing difference is within a range of N1 to N2 milliseconds. In some embodiments, the foregoing first bit group is used for indication. A value indicated by the first bit group is configured by default or by the network. It can also be understood that N1 and N2 are configured by default or by the network.
(b) The TA value or the difference is reported when the TA value or the foregoing difference is less than or greater than a threshold (that is, the TA value or the foregoing difference is less than the foregoing first threshold; or the TA value or the difference is greater than the second threshold), or is within a threshold range (that is, the TA value or the difference is greater than the third threshold and less than the fourth threshold).

In some embodiments, a value of each threshold, and a reporting condition of the TA value or the foregoing difference (that is, reporting is performed in the case of being less than the first threshold, or being greater than the second threshold, or being greater than the third threshold, and being less than the fourth threshold) are determined through default setting, a network configuration, or UE determination.

(c) The TA value or the foregoing difference may be reported together with an RS ID and beam quality.

(d) The TA value or the foregoing difference may be reported together with a TRP ID, a cell ID, or ID-related information.

(e) The TA value or the foregoing difference may be reported together with a panel (antenna panel) ID and panel ID-related information.

It can be learned from the foregoing that the solutions provided in the embodiments of the present disclosure mainly include:

1. When groupBasedBeamReporting in CSI-ReportConfig is set to "enable", a beam report is associated with a neighbor TRP or a neighbor cell.

After signaling is configured by default or by a network, RSs reported in the beam report may be RSs belonging to different cells or different TRPs.

2. In a case that groupBasedBeamReporting in CSI-ReportConfig is set to "enable", after signaling is configured by default and/or by a network, UE may select whether to perform reporting according to a case that groupBasedBeamReporting is set to "disable".

3. The beam report (L1 report and/or L3 report and/or higher layer report) carries a timing advance value.

In conclusion, the solutions provided in the embodiments of the present disclosure provide a beam reporting enhancement solution from a perspective of enhanced mobility management, including not only group-based beam reporting enhancement, but also a beam report carrying a timing advance value, thereby effectively improving system flexibility.

Figure 7:
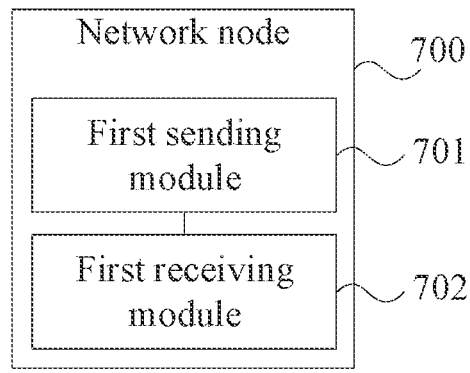
FIG. 7 is a first schematic structural diagram of a network node according to an embodiment of the present disclosure.

As shown in FIG. 7, an embodiment of the present disclosure provides a network node 700, including:

a first sending module 701, configured to send a channel state information report configuration to a terminal; and a first receiving module 702, configured to receive a beam report reported by the terminal according to the channel state information report configuration, where group reporting in the channel state information report configuration is set to enable, a function of associating the beam report with a neighbor network node is activated, and the beam report is associated with a neighbor network node.

In this embodiment of the present disclosure, the function is activated in at least one of the following manners:

the function is activated by default; and first signaling is processed in at least one of the following manners:

being configured by the network node;

being activated by the network node; and being updated by the network node.

In some embodiments, the associating the beam report with a neighbor network node is indicated by the network node to the terminal in a first association manner; and the first association manner includes at least one of the following manners: the network node configures first higher layer signaling; the network node configures at least one of identifier information and identifier related information of a neighbor network node; the network node activates at least one of the identifier information and the identifier related information of the neighbor network node; and the network node updates at least one of the identifier information and the identifier related information of the neighbor network node.

Signaling in which the identifier related information is located includes at least one of higher layer signaling and physical layer signaling.

In this embodiment of the present disclosure, the higher layer signaling includes at least one of the following: a cell group configuration, a special cell configuration, a synchronous reconfiguration, a serving cell common configuration, and a serving cell configuration.

The physical layer signaling includes at least one of the following: a channel state information measurement configuration, a channel state information report configuration, a channel state information resource configuration, a non-zero power channel state information-reference signal resource set, a non-zero power channel state information-reference signal resource, a channel state information synchronization signal block resource set, a channel sounding reference signal configuration, a channel sounding reference signal resource set, a sounding reference signal resource, a physical downlink control channel configuration, a physical downlink shared channel configuration, a physical uplink control channel configuration, and a physical uplink shared channel configuration.

In this embodiment of the present disclosure, reference signals RSs reported in the beam report are RSs belonging to different network nodes.

A maximum of N RSs are reported for each network node, or N RSs are reported for each network node; and N is determined through at least one of default setting, a network configuration, and terminal reporting.

In some embodiments, N=1, or N>1; where if N>1, at least one of a reporting sequence and reporting priorities of N RSs in the beam report is determined according to at least one of the following rules: being determined according to a reference signal identifier; being determined according to an RS type; being determined according to beam quality; and being determined through at least one of a network configuration, default setting, and terminal determination.

In this embodiment of the present disclosure, the beam report carries at least one of identifier information and identifier related information of a network node.

At least one of a reporting sequence and reporting priorities of RSs in the beam report is determined according to at least one of the following rules: a reporting priority of an RS of a current network node is higher than a reporting priority of an RS of a neighbor network node; and if there are a plurality of neighbor network nodes, at least one of a reporting sequence and reporting priorities of RSs between neighbor network nodes is determined through at least one of a network configuration, default setting, and terminal reporting.

In some embodiments, at least one of the reporting sequence and the reporting priorities of the RSs between the neighbor network nodes is determined according to at least one of the following rules: beam quality, cell quality, and network node quality; identifier information and identifier related information of a neighbor network node; a physical distance between a neighbor network node and a current network node; and a physical location of a neighbor network node.

According to the network node provided in this embodiment of the present disclosure, a channel state information report configuration is sent to a terminal; and a beam report reported by the terminal according to the channel state information report configuration is received, where group reporting in the channel state information report configuration is set to enable, a function of associating the beam report with a neighbor network node is activated, and the beam report is associated with a neighbor network node. In this way, in addition to being associated with an RS of a current network node, the beam report can be associated with an RS of another network node, so that a problem in the prior art that the beam report can be associated with only an RS of a current cell can be resolved.

It should be noted that the network node embodiment is the network node corresponding to the foregoing beam reporting method applied to the network node. All implementations of the foregoing embodiment are applicable to the network node embodiment, and a same technical effect can also be achieved.

Figure 8:
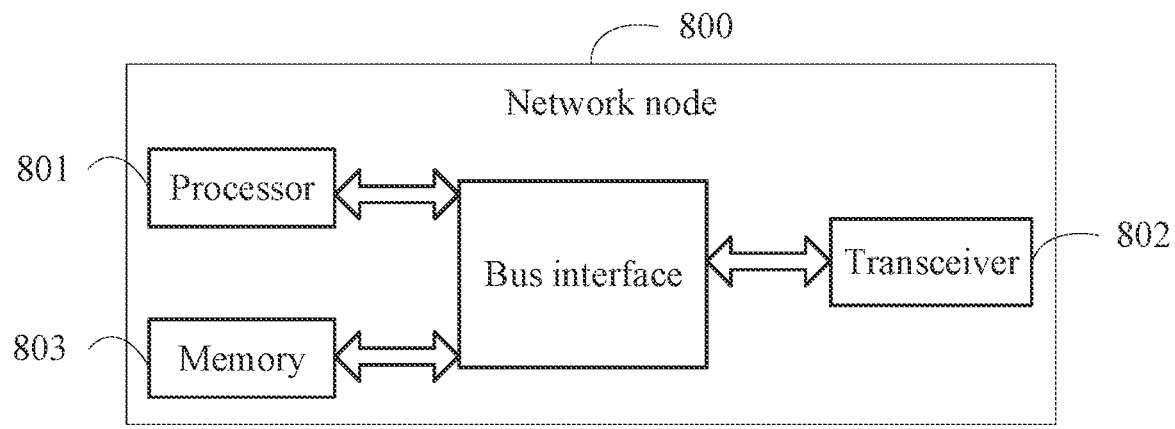
FIG. 8 is a second schematic structural diagram of a network node according to an embodiment of the present disclosure.

FIG. 8 is a structural diagram of a network node according to an embodiment of the present disclosure, and the network node can implement details of the foregoing beam reporting method and achieve a same effect. As shown in FIG. 8, a network node 800 includes a processor 801, a transceiver 802, a memory 803, and a bus interface. The beam reporting method includes:

sending a channel state information report configuration to a terminal; and receiving a beam report reported by the terminal according to the channel state information report configuration, where group reporting in the channel state information report configuration is set to enable, a function of associating the beam report with a neighbor network node is activated, and the beam report is associated with a neighbor network node.

In FIG. 8, a bus architecture may include any quantity of interconnected buses and bridges. In some embodiments, various circuits of one or more processors represented by the processor 801 and a memory represented by the memory 803 are interconnected. The bus architecture may further link various other circuits such as a peripheral device, a voltage regulator, and a power management circuit. These are well known in the art, and therefore are not further described in this specification. A bus interface provides an interface. The transceiver 802 may be a plurality of components. To be specific, the transceiver 802 includes a transmitter and a receiver, and provides a unit configured to communicate with various other apparatuses on a transmission medium.

For example, an embodiment of the present disclosure further provides a network node, including a processor, a memory, and a computer program that is stored in the memory and that can be run on the processor. When the computer program is executed by the processor, the foregoing processes of the beam reporting method embodiment applied to the network side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the beam reporting method embodiment applied to the network side are implemented and a same technical effect can be achieved. To avoid repetition, details are not described herein again. The computer-readable storage medium includes a Read-Only Memory (ROM), a Random Access Memory (RAM), a magnetic disk, or an optical disc.

The network node may be a Base Transceiver Station (BTS) in a Global System of Mobile communication (GSM) or Code Division Multiple Access (CDMA), or may be a NodeB (NB) in Wideband Code Division Multiple Access (WCDMA), or may be an evolved NodeB (Evolutional NodeB, eNB or eNodeB), a relay station, or an access point in LTE, or a base station in a future 5G network, or the like. This is not limited herein.

Figure 9:
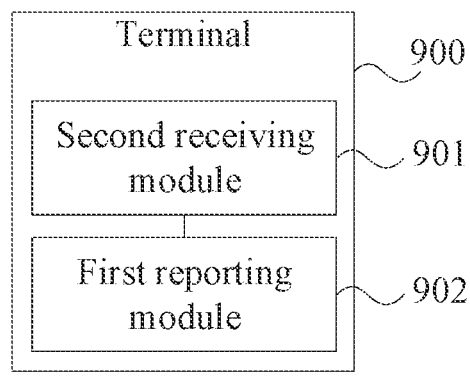
FIG. 9 is a first schematic structural diagram of a terminal according to an embodiment of the present disclosure.

As shown in FIG. 9, an embodiment of the present disclosure provides a terminal 900, including:

a second receiving module 901, configured to receive a channel state information report configuration sent by a network node; and a first reporting module 902, configured to report a beam report to the network node according to the channel state information report configuration, where group reporting in the channel state information report configuration is set to enable, a function of associating the beam report with a neighbor network node is activated, and the beam report is associated with a neighbor network node.

In this embodiment of the present disclosure, the function is activated in at least one of the following manners:

the function is activated by default; and first signaling is processed in at least one of the following manners:

being configured by the network node;

being activated by the network node; and being updated by the network node.

In some embodiments, the associating the beam report with a neighbor network node is indicated by the network node to the terminal in a first association manner; and the first association manner includes at least one of the following manners: the network node configures first higher layer signaling, the network node configures at least one of identifier information and identifier related information of a neighbor network node; the network node activates at least one of the identifier information and the identifier related information of the neighbor network node; and the network node updates at least one of the identifier information and the identifier related information of the neighbor network node.

Signaling in which the identifier related information is located includes at least one of higher layer signaling and physical layer signaling.

In this embodiment of the present disclosure, the higher layer signaling includes at least one of the following: a cell group configuration, a special cell configuration, a synchronous reconfiguration, a serving cell common configuration, and a serving cell configuration.

The physical layer signaling includes at least one of the following: a channel state information measurement configuration, a channel state information report configuration, a channel state information resource configuration, a non-zero power channel state information-reference signal resource set, a non-zero power channel state information-reference signal resource, a channel state information synchronization signal block resource set, a channel sounding reference signal configuration, a channel sounding reference signal resource set, a sounding reference signal resource, a physical downlink control channel configuration, a physical downlink shared channel configuration, a physical uplink control channel configuration, and a physical uplink shared channel configuration.

In this embodiment of the present disclosure, reference signals RSs reported in the beam report are RSs belonging to different network nodes.

A maximum of N RSs are reported for each network node, or N RSs are reported for each network node; and N is determined through at least one of default setting, a network configuration, and terminal reporting.

In some embodiments, N=1, or N>1; where if N>1, at least one of a reporting sequence and reporting priorities of N RSs in the beam report is determined according to at least one of the following rules: being determined according to a reference signal identifier; being determined according to an RS type; being determined according to beam quality; and being determined through at least one of a network configuration, default setting, and terminal determination.

In this embodiment of the present disclosure, the beam report carries at least one of identifier information and identifier related information of a network node.

At least one of a reporting sequence and reporting priorities of RSs in the beam report is determined according to at least one of the following rules: a reporting priority of an RS of a current network node is higher than a reporting priority of an RS of a neighbor network node; and if there are a plurality of neighbor network nodes, at least one of a reporting sequence and reporting priorities of RSs between neighbor network nodes is determined through at least one of a network configuration, default setting, and terminal reporting.

In some embodiments, at least one of the reporting sequence and the reporting priorities of the RSs between the neighbor network nodes is determined according to at least one of the following rules: beam quality, cell quality, and network node quality; identifier information and identifier related information of a neighbor network node; a physical distance between a neighbor network node and a current network node; and a physical location of a neighbor network node.

According to the terminal provided in this embodiment of the present disclosure, a channel state information report configuration sent by a network node is received; and a beam report is reported to the network node according to the channel state information report configuration, where group reporting in the channel state information report configuration is set to enable, a function of associating the beam report with a neighbor network node is activated, and the beam report is associated with a neighbor network node. In this way, in addition to being associated with an RS of a current network node, the beam report can be associated with an RS of another network node, so that a problem in the prior art that the beam report can be associated with only an RS of a current cell can be resolved.

It should be noted that the terminal embodiment is the terminal corresponding to the foregoing beam reporting method applied to the terminal. All implementations of the foregoing embodiment are applicable to the terminal embodiment, and a same technical effect can also be achieved.

Figure 10:
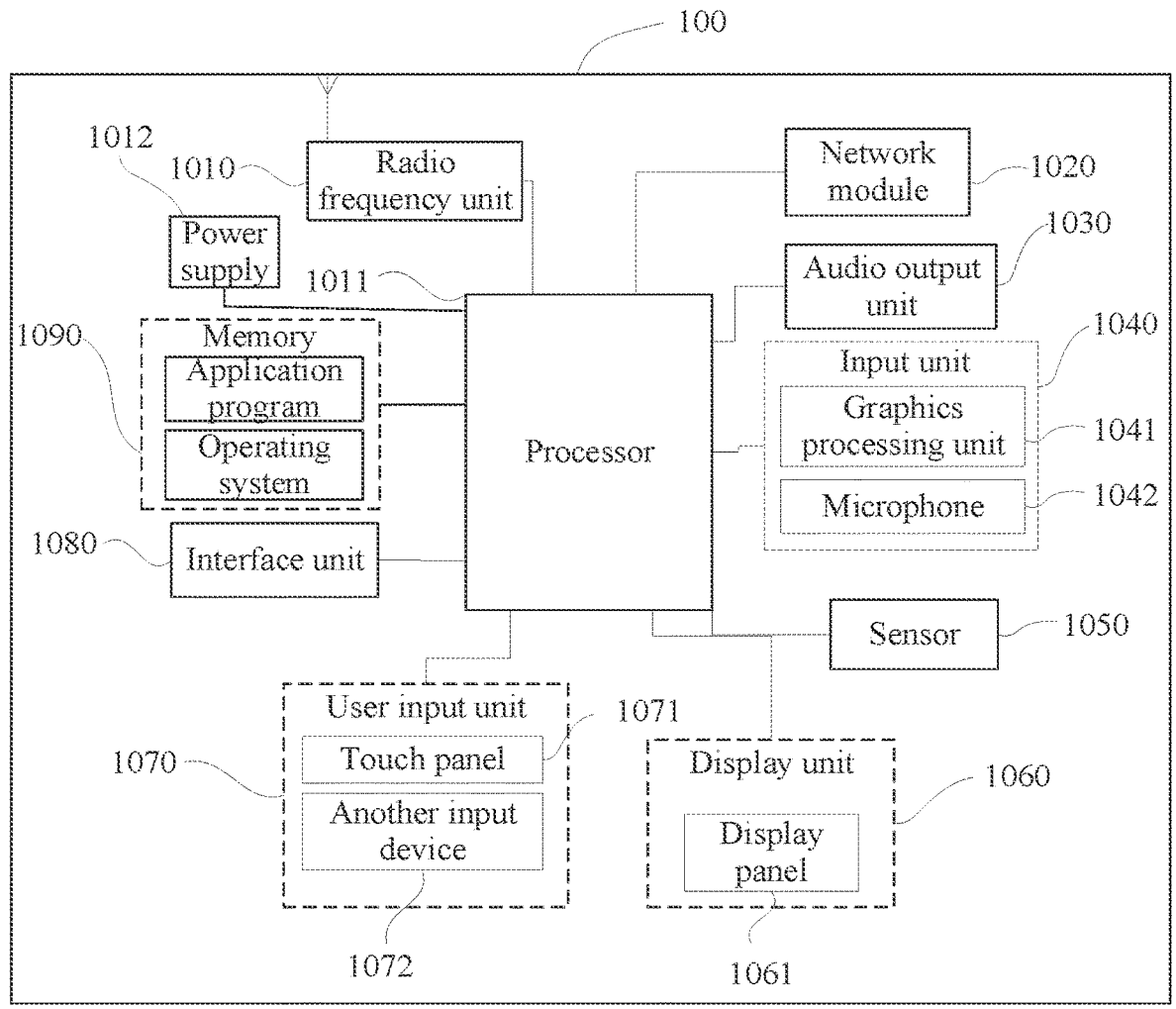
FIG. 10 is a second schematic structural diagram of a terminal according to an embodiment of the present disclosure.

FIG. 10 is a schematic diagram of a hardware structure of a terminal according to an embodiment of the present disclosure.

A terminal 100 includes but is not limited to components such as a radio frequency unit 1010, a network module 1020, an audio output unit 1030, an input unit 1040, a sensor 1050, a display unit 1060, a user input unit 1070, an interface unit 1080, a memory 1090, a processor 1011, and a power supply 1012. It can be understood by a person skilled in the art that, the terminal structure shown in FIG. 10 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The processor 1011 is configured to: receive a channel state information report configuration sent by a network node; and report a beam report to the network node according to the channel state information report configuration, where group reporting in the channel state information report configuration is set to enable, a function of associating the beam report with a neighbor network node is activated, and the beam report is associated with a neighbor network node.

According to the terminal in this embodiment of the present disclosure, a channel state information report configuration sent by a network node is received; and a beam report is reported to the network node according to the channel state information report configuration, where group reporting in the channel state information report configuration is set to enable, a function of associating the beam report with a neighbor network node is activated, and the beam report is associated with a neighbor network node. In this way, in addition to being associated with an RS of a current network node, the beam report can be associated with an RS of another network node, so that a problem in the prior art that the beam report can be associated with only an RS of a current cell can be resolved.

It should be understood that, in this embodiment of the present disclosure, the radio frequency unit 1010 may be configured to receive and send information or a signal in a call process. In some embodiments, after receiving downlink data from a network node, the radio frequency unit 1010 sends the downlink data to the processor 1011 for processing. In addition, the radio frequency unit 1010 sends uplink data to the network node. Usually, the radio frequency unit 1010 includes but is not limited to an antenna, at least one amplifier, a transceiver, a coupler, a low noise amplifier, a duplexer, and the like. In addition, the radio frequency unit 1010 may communicate with a network and another device through a wireless communication system.

The terminal provides wireless broadband Internet access for the user by using the network module 1020, for example, helping the user to send and receive an e-mail, brows a web page, and access streaming media.

The audio output unit 1030 may convert audio data received by the radio frequency unit 1010 or the network module 1020 or stored in the memory 1090 into an audio signal and output the audio signal as a sound. In addition, the audio output unit 1030 may further provide an audio output (for example, a call signal received voice, or a message received voice) related to a specific function implemented by the terminal 100. The audio output unit 1030 includes a speaker, a buzzer, a telephone receiver, and the like.

The input unit 1040 is configured to receive an audio signal or a video signal. The input unit 1040 may include a Graphics Processing Unit (GPU) 1041 and a microphone 1042, and the graphics processing unit 1041 processes image data of a still picture or video obtained by an image capture apparatus (such as a camera) in a video capture mode or an image capture mode. A processed image frame may be displayed on the display unit 1060. The image frame processed by the graphics processing unit 1041 may be stored in the memory 1090 (or another storage medium) or sent by using the radio frequency unit 1010 or the network module 1020. The microphone 1042 may receive a sound and can process such sound into audio data. Processed audio data may be converted, in a call mode, into a format that can be sent to a mobile communication network node by using the radio frequency unit 1010 for output.

The terminal 100 further includes at least one type of sensor 1050, such as a light sensor, a motion sensor, and another sensor. In some embodiments, the light sensor includes an ambient light sensor and a proximity sensor. The ambient light sensor may adjust luminance of the display panel 1061 based on brightness of ambient light. The proximity sensor may turn off the display panel 1061 and/or backlight when the terminal 100 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 1050 may further include a fingerprint sensor, a pressure sensor, an iris sensor, a molecular sensor, a gyroscope, a barometer, a hygrometer, a thermometer, an infrared sensor, and the like. Details are not described herein.

The display unit 1060 is configured to display information entered by a user or information provided for a user. The display unit 1060 may include a display panel 1061. The display panel 1061 may be configured in a form of a Liquid Crystal Display (LCD), an Organic Light-Emitting Diode (OLED), or the like.

The user input unit 1070 may be configured to receive input numeral or character information, and generate key signal input related to user setting and functional control of the terminal. In some embodiments, the user input unit 1070 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 1011, and can receive and execute a command sent by the processor 1011. In addition, the touch panel 1071 may be of a resistive type, a capacitive type, an infrared type, a surface acoustic wave type, or the like. The user input unit 1070 may include another input device 1072 in addition to the touch panel 1071. In some embodiments, the another input device 1072 may include but is not limited to a physical keyboard, a functional button (such as a volume control button or a power on/off button), a trackball, a mouse, and a joystick. Details are not described herein.

Further, the touch panel 1071 may cover the display panel 1061. When detecting the touch operation on or near the touch panel 1071, the touch panel 1071 transmits the touch operation to the processor 1011 to determine a type of a touch event, and then the processor 1011 provides corresponding visual output on the display panel 1061 based on the type of the touch event. In FIG. 10, although the touch panel 1071 and the display panel 1061 are used as two independent parts to implement input and output functions of the terminal, in some embodiments, the touch panel 1071 and the display panel 1061 may be integrated to implement the input and output functions of the terminal. This is not specifically limited herein.

The interface unit 1080 is an interface for connecting an external apparatus with the terminal 100. For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 1080 may be configured to receive input (for example, data information and power) from an external apparatus and transmit the received input to one or more elements in the terminal 100 or may be configured to transmit data between the terminal 100 and an external apparatus.

The memory 1090 may be configured to store a software program and various data. The memory 1090 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1090 may include a high-speed random access memory, and may further include a nonvolatile memory, for example, at least one magnetic disk storage device, a flash storage device, or another volatile solid-state storage device.

The processor 1011 is a control center of the terminal, and connects all parts of the entire terminal by using various interfaces and lines. By running or executing a software program and/or a module stored in the memory 1090 and invoking data stored in the memory 1090, the processor 1011 performs various functions of the terminal and data processing, to perform overall monitoring on the terminal. In some embodiments, the processor 1011 may include one or more processing units. In some embodiments, an application processor and a modem processor may be integrated into the processor 1011. The application processor mainly processes an operating system, a user interface, an application, and the like. The modem processor mainly processes wireless communications. It can be understood that, alternatively, the modem processor may not be integrated into the processor 1011.

The terminal 100 may further include the power supply 1012 (such as a battery) that supplies power to each component. In some embodiments, the power supply 1012 may be logically connected to the processor 1011 by using a power management system, so as to implement functions such as charging, discharging, and power consumption management by using the power management system.

In addition, the terminal 100 includes some function modules not shown, and details are not described herein.

For example, an embodiment of the present disclosure further provides a terminal, including a processor 1011, a memory 1090, and a computer program that is stored in the memory 1090 and that can be run on the processor 1011. When the computer program is executed by the processor 1011, the foregoing processes of the beam reporting method embodiment applied to the terminal side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the beam reporting method embodiment applied to the terminal side are implemented and a same technical effect can be achieved. To avoid repetition, details are not described herein again. The computer-readable storage medium includes a Read-Only Memory (ROM), a Random Access Memory (RAM), a magnetic disk, or an optical disc.

Figure 11:
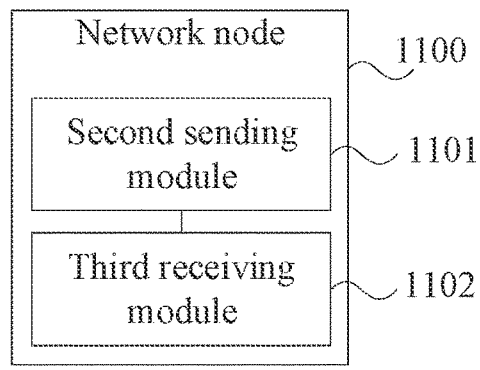
FIG. 11 is a third schematic structural diagram of a network node according to an embodiment of the present disclosure.

As shown in FIG. 11, an embodiment of the present disclosure provides a network node 1100, including:
  a second sending module 1101, configured to send a channel state information report configuration to a terminal; and
  a third receiving module 1102, configured to receive a beam report reported by the terminal according to the channel state information report configuration, where group reporting in the channel state information report configuration is set to enable, and the terminal determines, through at least one of default setting and second signaling sent by the network node, whether to report the beam report according to a case that group reporting is set to disable.

Further, the network node further includes: determining a beam selection result of the terminal in at least one of the following manners: being determined by using at least one of payloads or overheads of the beam report, and the number of to-be-reported reference signals RSs; being determined by using indication information carried in the beam report; and being determined based on a case that all RSs in the beam report are RSs of one network node, or the beam report does not carry at least one of identifier information and identifier related information of a network node; or when the beam report is associated with a neighbor network node, RSs reported in the beam report are RSs belonging to different network nodes, or all RSs reported in the beam report are RSs of one network node.

An occupied bit of the indication information is 1 bit, an indication value 0 of the bit indicates that the terminal reports the beam report according to a case that group reporting is set to enable, and an indication value 1 of the bit indicates that the terminal reports the beam report according to a case that group reporting is set to disable, or an indication value 0 of the bit indicates that the terminal reports the beam report according to a case that group reporting is set to disable, and an indication value 1 of the bit indicates that the terminal reports the beam report according to a case that group reporting is set to enable.

According to the network node provided in this embodiment of the present disclosure, a channel state information report configuration is sent to a terminal, and a beam report reported by the terminal according to the channel state information report configuration is received, where group reporting in the channel state information report configuration is set to enable, and the terminal determines, through at least one of default setting and second signaling sent by the network node, whether to report the beam report according to a case that group reporting is set to disable. In this way, in a case that group reporting is set to enable, UE can autonomously determine whether to report a beam report according to a case that group reporting is set to disable, so that a problem in the prior art that the UE must perform beam reporting according to setting of groupBasedBeamReporting is resolved.

It should be noted that the network node embodiment is the network node corresponding to the foregoing beam reporting method applied to the network node. All implementations of the foregoing embodiment are applicable to the network node embodiment, and a same technical effect can also be achieved.

Figure 12:
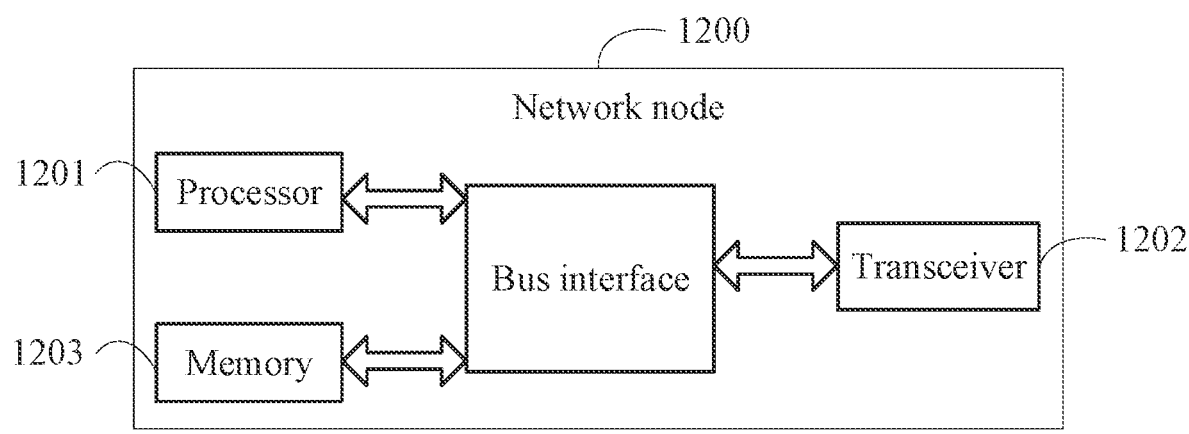
FIG. 12 is a fourth schematic structural diagram of a network node according to an embodiment of the present disclosure.

FIG. 12 is a structural diagram of a network node according to an embodiment of the present disclosure, and the network node can implement details of the foregoing beam reporting method and achieve a same effect. As shown in FIG. 12, a network node 1200 includes a processor 1201, a transceiver 1202, a memory 1203, and a bus interface. The beam reporting method includes:
  sending a channel state information report configuration to a terminal; and
  receiving a beam report reported by the terminal according to the channel state information report configuration, where group reporting in the channel state information report configuration is set to enable, and the terminal determines, through at least one of default setting and second signaling sent by the network node, whether to report the beam report according to a case that group reporting is set to disable.

In FIG. 12, a bus architecture may include any quantity of interconnected buses and bridges. In some embodiments, various circuits of one or more processors represented by the processor 1201 and a memory represented by the memory 1203 are interconnected. The bus architecture may further link various other circuits such as a peripheral device, a voltage regulator, and a power management circuit. These are well known in the art, and therefore are not further described in this specification. A bus interface provides an interface. The transceiver 1202 may be a plurality of components. To be specific, the transceiver 1202 includes a transmitter and a receiver, and provides a unit configured to communicate with various other apparatuses on a transmission medium.

For example, an embodiment of the present disclosure further provides a network node, including a processor, a memory, and a computer program that is stored in the memory and that can be run on the processor. When the computer program is executed by the processor, the foregoing processes of the beam reporting method embodiment applied to the network side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the beam reporting method embodiment applied to the network side are implemented and a same technical effect can be achieved. To avoid repetition, details are not described herein again. The computer-readable storage medium includes a ROM, a RAM, a magnetic disk, or an optical disc.

The network node may be a BTS in a GSM or CDMA, or may be a NB in WCDMA, or may be an evolved NodeB (Evolutional NodeB, eNB or eNodeB), a relay station, or an access point in LTE, or a base station in a future 5G network, or the like. This is not limited herein.

Figure 13:
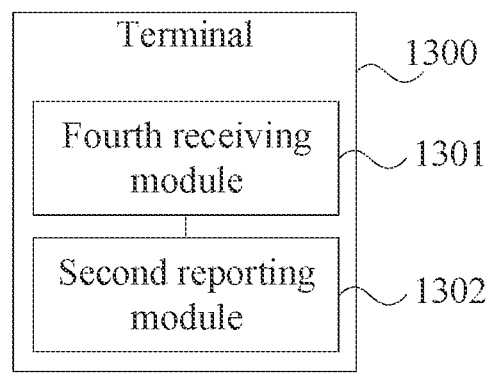
FIG. 13 is a third schematic structural diagram of a terminal according to an embodiment of the present disclosure.

As shown in FIG. 13, an embodiment of the present disclosure provides a terminal 1300, including:

a fourth receiving module 1301, configured to receive a channel state information report configuration sent by a network node; and a second reporting module 1302, configured to report a beam report to the network node according to the channel state information report configuration, where group reporting in the channel state information report configuration is set to enable, and the terminal determines, through at least one of default setting and second signaling sent by the network node, whether to report the beam report according to a case that group reporting is set to disable.

Further, the terminal further includes: notifying the network node of a beam selection result of the terminal in at least one of the following manners: being notified by using at least one of payloads or overheads of the beam report, and the number of to-be-reported reference signals RSs; being notified by using indication information carried in the beam report; and being notified based on a case that all RSs in the beam report are RSs of one network node, or the beam report does not carry at least one of identifier information and identifier related information of a network node; or when the beam report is associated with a neighbor network node, RSs reported in the beam report are RSs belonging to different network nodes, or all RSs reported in the beam report are RSs of one network node.

An occupied bit of the indication information is 1 bit, an indication value 0 of the bit indicates that the terminal reports the beam report according to a case that group reporting is set to enable, and an indication value 1 of the bit indicates that the terminal reports the beam report according to a case that group reporting is set to disable, or an indication value 0 of the bit indicates that the terminal reports the beam report according to a case that group reporting is set to disable, and an indication value 1 of the bit indicates that the terminal reports the beam report according to a case that group reporting is set to enable.

According to the terminal provided in this embodiment of the present disclosure, a channel state information report configuration sent by a network node is received; and a beam report is reported to the network node according to the channel state information report configuration, where group reporting in the channel state information report configuration is set to enable, and the terminal determines, through at least one of default setting and second signaling sent by the network node, whether to report the beam report according to a case that group reporting is set to disable. In this way, in a case that group reporting is set to enable, UE can autonomously determine whether to report a beam report according to a case that group reporting is set to disable, so that a problem in the prior art that the UE must perform beam reporting according to setting of groupBasedBeamReporting is resolved.

It should be noted that the terminal embodiment is the terminal corresponding to the foregoing beam reporting method applied to the terminal. All implementations of the foregoing embodiment are applicable to the terminal embodiment, and a same technical effect can also be achieved.

Figure 14:
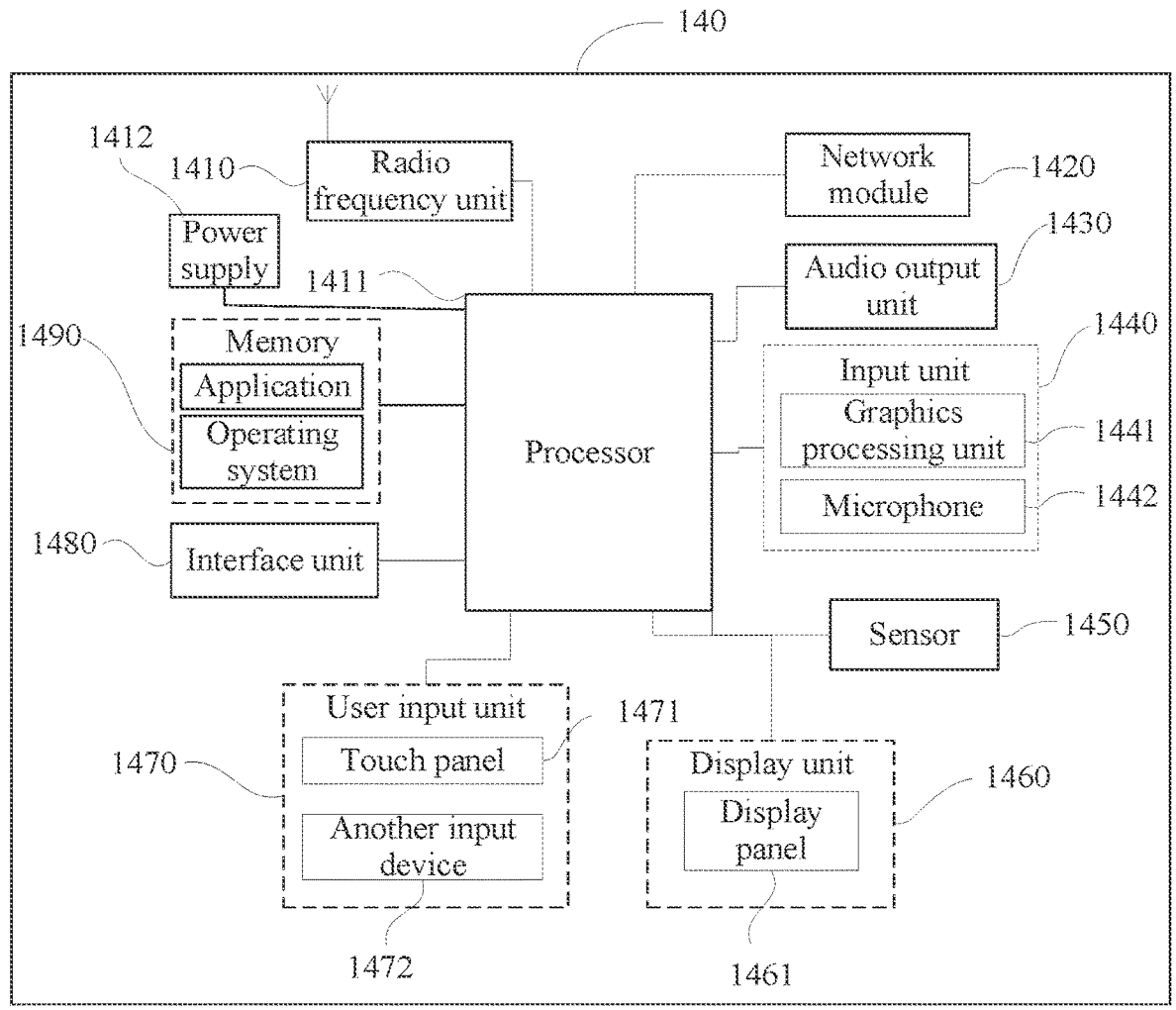
FIG. 14 is a fourth schematic structural diagram of a terminal according to an embodiment of the present disclosure.

FIG. 14 is a schematic diagram of a hardware structure of a terminal according to an embodiment of the present disclosure.

A terminal 140 includes but is not limited to components such as a radio frequency unit 1410, a network module 1420, an audio output unit 1430, an input unit 1440, a sensor 1450, a display unit 1460, a user input unit 1470, an interface unit 1480, a memory 1490, a processor 1411, and a power supply 1412. It can be understood by a person skilled in the art that, the terminal structure shown in FIG. 14 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The processor 1411 is configured to: receive a channel state information report configuration sent by a network node; and report a beam report to the network node according to the channel state information report configuration, where group reporting in the channel state information report configuration is set to enable, and the terminal determines, through at least one of default setting and second signaling sent by the network node, whether to report the beam report according to a case that group reporting is set to disable.

According to the terminal in this embodiment of the present disclosure, a channel state information report configuration sent by a network node is received; and a beam report is reported to the network node according to the channel state information report configuration, where group reporting in the channel state information report configuration is set to enable, and the terminal determines, through at least one of default setting and second signaling sent by the network node, whether to report the beam report according to a case that group reporting is set to disable. In this way, in a case that group reporting is set to enable, UE can autonomously determine whether to report a beam report according to a case that group reporting is set to disable, so that a problem in the prior art that the UE must perform beam reporting according to setting of groupBasedBeamReporting is resolved.

It should be understood that, in this embodiment of the present disclosure, the radio frequency unit 1410 may be configured to receive and send information or a signal in a call process. In some embodiments, after receiving downlink data from a network node, the radio frequency unit 1410 sends the downlink data to the processor 1411 for processing. In addition, the radio frequency unit 1410 sends uplink data to the network node. Usually, the radio frequency unit 1410 includes but is not limited to an antenna, at least one amplifier, a transceiver, a coupler, a low noise amplifier, a duplexer, and the like. In addition, the radio frequency unit 1410 may communicate with a network and another device through a wireless communication system.

The terminal provides wireless broadband Internet access for the user by using the network module 1420, for example, helping the user to send and receive an e-mail, brows a web page, and access streaming media.

The audio output unit 1430 may convert audio data received by the radio frequency unit 1410 or the network module 1420 or stored in the memory 1490 into an audio signal and output the audio signal as a sound. In addition, the audio output unit 1430 may further provide an audio output (for example, a call signal received voice, or a message received voice) related to a specific function implemented by the terminal 140. The audio output unit 1430 includes a speaker, a buzzer, a telephone receiver, and the like.

The input unit 1440 is configured to receive an audio signal or a video signal. The input unit 1440 may include a GPU 1441 and a microphone 1442, and the graphics processing unit 1441 processes image data of a still picture or video obtained by an image capture apparatus (such as a camera) in a video capture mode or an image capture mode. A processed image frame may be displayed on the display unit 1460. The image frame processed by the graphics processing unit 1441 may be stored in the memory 1490 (or another storage medium) or sent by using the radio frequency unit 1410 or the network module 1420. The microphone 1442 may receive a sound and can process such sound into audio data. Processed audio data may be converted, in a call mode, into a format that can be sent to a mobile communication network node by using the radio frequency unit 1410 for output.

The terminal 140 further includes at least one type of sensor 1450, such as a light sensor, a motion sensor, and another sensor. In some embodiments, the light sensor includes an ambient light sensor and a proximity sensor. The ambient light sensor may adjust luminance of the display panel 1461 based on brightness of ambient light. The proximity sensor may turn off the display panel 1461 and/or backlight when the terminal 140 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 1450 may further include a fingerprint sensor, a pressure sensor, an iris sensor, a molecular sensor, a gyroscope, a barometer, a hygrometer, a thermometer, an infrared sensor, and the like. Details are not described herein.

The display unit 1460 is configured to display information entered by a user or information provided for a user. The display unit 1460 may include a display panel 1461. The display panel 1461 may be configured in a form of a LCD, an OLED, or the like.

The user input unit 1470 may be configured to receive input numeral or character information, and generate key signal input related to user setting and functional control of the terminal. In some embodiments, the user input unit 1470 includes a touch panel 1471 and another input device 1472. The touch panel 1471 is also referred to as a touchscreen, and may collect a touch operation performed by a user on or near the touch panel 1471 (such as an operation performed by a user on the touch panel 1471 or near the touch panel 1471 by using any proper object or accessory, such as a finger or a stylus). The touch panel 1471 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 1411, and can receive and execute a command sent by the processor 1411. In addition, the touch panel 1471 may be of a resistive type, a capacitive type, an infrared type, a surface acoustic wave type, or the like. The user input unit 1470 may include another input device 1472 in addition to the touch panel 1471. In some embodiments, the another input device 1472 may include but is not limited to a physical keyboard, a functional button (such as a volume control button or a power on/off button), a trackball, a mouse, and a joystick. Details are not described herein.

Further, the touch panel 1471 may cover the display panel 1461. When detecting the touch operation on or near the touch panel 1471, the touch panel 1471 transmits the touch operation to the processor 1411 to determine a type of a touch event, and then the processor 1411 provides corresponding visual output on the display panel 1461 based on the type of the touch event. In FIG. 14, although the touch panel 1471 and the display panel 1461 are used as two independent parts to implement input and output functions of the terminal, in some embodiments, the touch panel 1471 and the display panel 1461 may be integrated to implement the input and output functions of the terminal. This is not specifically limited herein.

The interface unit 1480 is an interface for connecting an external apparatus with the terminal 140. For example, the external apparatus may include a wired or wireless headphone port, an external power supply (or a battery charger) port, a wired or wireless data port, a storage card port, a port used to connect to an apparatus having an identity module, an audio I/O port, a video I/O port, a headset port, and the like. The interface unit 1480 may be configured to receive input (for example, data information and power) from an external apparatus and transmit the received input to one or more elements in the terminal 140 or may be configured to transmit data between the terminal 140 and an external apparatus.

The memory 1490 may be configured to store a software program and various data. The memory 1490 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1490 may include a high-speed random access memory, and may further include a nonvolatile memory, for example, at least one magnetic disk storage device, a flash storage device, or another volatile solid-state storage device.

The processor 1411 is a control center of the terminal, and connects all parts of the entire terminal by using various interfaces and lines. By running or executing a software program and/or a module stored in the memory 1490 and invoking data stored in the memory 1490, the processor 1411 performs various functions of the terminal and data processing, to perform overall monitoring on the terminal. In some embodiments, the processor 1411 may include one or more processing units. In some embodiments, an application processor and a modem processor may be integrated into the processor 1411. The application processor mainly processes an operating system, a user interface, an application, and the like. The modem processor mainly processes wireless communications. It can be understood that, in some embodiments, the modem processor may not be integrated into the processor 1411.

The terminal 140 may further include the power supply 1412 (such as a battery) that supplies power to each component. In some embodiments, the power supply 1412 may be logically connected to the processor 1411 by using a power management system, so as to implement functions such as charging, discharging, and power consumption management by using the power management system.

In addition, the terminal 140 includes some function modules not shown, and details are not described herein.

For example, an embodiment of the present disclosure further provides a terminal, including a processor 1411, a memory 1490, and a computer program that is stored in the memory 1490 and that can be run on the processor 1411. When the computer program is executed by the processor 1411, the foregoing processes of the beam reporting method embodiment applied to the terminal side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the beam reporting method embodiment applied to the terminal side are implemented and a same technical effect can be achieved. To avoid repetition, details are not described herein again. The computer-readable storage medium includes a ROM, a RAM, a magnetic disk, or an optical disc.

Figure 15:
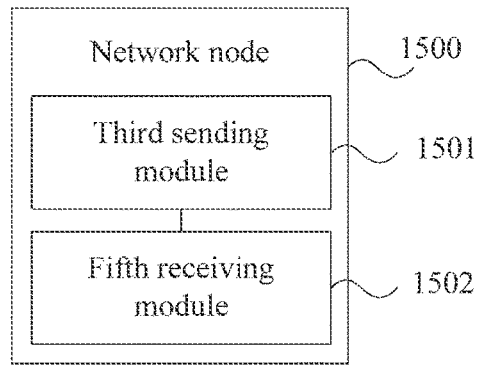
FIG. 15 is a fifth schematic structural diagram of a network node according to an embodiment of the present disclosure.

As shown in FIG. 15, an embodiment of the present disclosure provides a network node 1500, including:

a third sending module 1501, configured to send configuration information associated with a beam report to a terminal; and a fifth receiving module 1502, configured to receive a beam report reported by the terminal according to the configuration information, where the beam report carries a timing advance TA value.

In this embodiment of the present disclosure, a layer 1 beam report in the beam report carries a TA value, where the layer 1 beam report is associated with a neighbor network node, or the configuration information is associated with a neighbor network node; and in the configuration information, at least one of identifier information and identifier related information of a neighbor network node is processed in at least one of the following manners: being configured by the network node; being activated by the network node; and being updated by the network node.

In this embodiment of the present disclosure, at least one of a layer 3 beam report and a higher layer report in the beam report carries a TA value in a case of dual connectivity or in a case of non-dual connectivity.

In the configuration information, configured third signaling is enabled or disabled, or third signaling is configured or third signaling is not configured.

In this embodiment of the present disclosure, that the beam report carries a TA value includes: the beam report carries at least one of timing and a TA value of a neighbor network node, or carries at least one of a difference between timing of the neighbor network node and timing of a current network node, and a difference between a TA value of the neighbor network node and a TA value of the current network node.

A value range corresponding to the TA value or the difference is indicated by a first bit group, and a value indicated by the first bit group is a default value or is configured by a network; and the first bit group includes at least one bit.

In this embodiment of the present disclosure, the TA value or the difference is reported only when at least one of the following reporting conditions is met: the TA value or the difference is less than a first threshold; the TA value or the difference is greater than a second threshold; and the TA value or the difference is greater than a third threshold and less than a fourth threshold, where specific values of the first threshold, the second threshold, the third threshold, and the fourth threshold, and a specific reporting condition of the TA value or the difference value are determined through default setting or a network configuration, or determined by the terminal.

The TA value is reported together with at least one of the following information: at least one of a reference signal identifier and beam quality; at least one of identifier information and identifier related information of a network node; and at least one of identifier information and identifier related information of an antenna panel.

According to the network node provided in this embodiment of the present disclosure, configuration information associated with a beam report is sent to a terminal; and a beam report reported by the terminal according to the configuration information is received, where the beam report carries a TA value. In this way, a network can quickly obtain TA information of UE and different cells, so that a problem in the prior art that the network cannot quickly obtain TA information of UE and different cells can be resolved.

It should be noted that the network node embodiment is the network node corresponding to the foregoing beam reporting method applied to the network node. All implementations of the foregoing embodiment are applicable to the network node embodiment, and a same technical effect can also be achieved.

Figure 16:
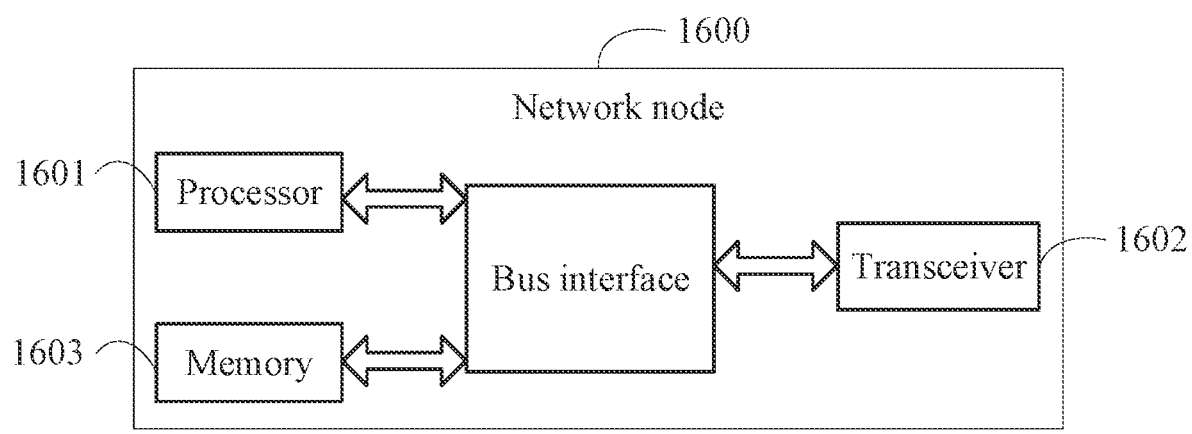
FIG. 16 is a sixth schematic structural diagram of a network node according to an embodiment of the present disclosure.

FIG. 16 is a structural diagram of a network node according to an embodiment of the present disclosure, and the network node can implement details of the foregoing beam reporting method and achieve a same effect. As shown in FIG. 16, a network node 1600 includes a processor 1601, a transceiver 1602, a memory 1603, and a bus interface. The beam reporting method includes:

sending configuration information associated with a beam report to a terminal; and receiving a beam report reported by the terminal according to the configuration information, where the beam report carries a TA value.

In FIG. 16, a bus architecture may include any quantity of interconnected buses and bridges. In some embodiments, various circuits of one or more processors represented by the processor 1601 and a memory represented by the memory 1603 are interconnected. The bus architecture may further link various other circuits such as a peripheral device, a voltage regulator, and a power management circuit. These are well known in the art, and therefore are not further described in this specification. A bus interface provides an interface. The transceiver 1602 may be a plurality of components. To be specific, the transceiver 1602 includes a transmitter and a receiver, and provides a unit configured to communicate with various other apparatuses on a transmission medium.

For example, an embodiment of the present disclosure further provides a network node, including a processor, a memory, and a computer program that is stored in the memory and that can be run on the processor. When the computer program is executed by the processor, the foregoing processes of the beam reporting method embodiment applied to the network side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the beam reporting method embodiment applied to the network side are implemented and a same technical effect can be achieved. To avoid repetition, details are not described herein again. The computer-readable storage medium includes a ROM, a RAM, a magnetic disk, or an optical disc.

The network node may be a BTS in a GSM or CDMA, or may be a NB in WCDMA, or may be an evolved NodeB (Evolutional NodeB, eNB or eNodeB, a relay station, or an access point in LTE, or a base station in a future 5G network, or the like. This is not limited herein.

Figure 17:
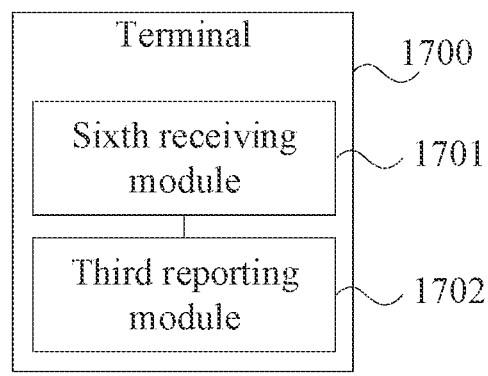
FIG. 17 is a fifth schematic structural diagram of a terminal according to an embodiment of the present disclosure.

As shown in FIG. 17, an embodiment of the present disclosure provides a terminal 1700, including:
- a sixth receiving module 1701, configured to receive configuration information that is associated with a beam report and that is sent by a network node; and
- a third reporting module 1702, configured to report a beam report to the network node according to the configuration information, where
- the beam report carries a TA value.

In this embodiment of the present disclosure, a layer 1 beam report in the beam report carries a TA value, where the layer 1 beam report is associated with a neighbor network node, or the configuration information is associated with a neighbor network node; and in the configuration information, at least one of identifier information and identifier related information of a neighbor network node is processed in at least one of the following manners: being configured by the network node; being activated by the network node; and being updated by the network node.

In this embodiment of the present disclosure, at least one of a layer 3 beam report and a higher layer report in the beam report carries a TA value in a case of dual connectivity or in a case of non-dual connectivity.

In the configuration information, configured third signaling is enabled or disabled, or third signaling is configured or third signaling is not configured.

In this embodiment of the present disclosure, that the beam report carries a TA value includes: the beam report carries at least one of timing and a TA value of a neighbor network node, or carries at least one of a difference between timing of the neighbor network node and timing of a current network node, and a difference between a TA value of the neighbor network node and a TA value of the current network node.

A value range corresponding to the TA value or the difference is indicated by a first bit group, and a value indicated by the first bit group is a default value or is configured by a network; and the first bit group includes at least one bit.

In this embodiment of the present disclosure, the TA value or the difference is reported only when at least one of the following reporting conditions is met: the TA value or the difference is less than a first threshold; the TA value or the difference is greater than a second threshold; and the TA value or the difference is greater than a third threshold and less than a fourth threshold, where specific values of the first threshold, the second threshold, the third threshold, and the fourth threshold, and a specific reporting condition of the TA value or the difference value are determined through default setting or a network configuration, or determined by the terminal.

The TA value is reported together with at least one of the following information: at least one of a reference signal identifier and beam quality; at least one of identifier information and identifier related information of a network node; and at least one of identifier information and identifier related information of an antenna panel.

According to the terminal provided in this embodiment of the present disclosure, configuration information that is associated with a beam report and that is sent by a network node is received; and a beam report is reported to the network node according to the configuration information, where the beam report carries a timing advance TA value. In this way, a network can quickly obtain TA information of UE and different cells, so that a problem in the prior art that the network cannot quickly obtain TA information of UE and different cells can be resolved.

It should be noted that the terminal embodiment is the terminal corresponding to the foregoing beam reporting method applied to the terminal. All implementations of the foregoing embodiment are applicable to the terminal embodiment, and a same technical effect can also be achieved.

Figure 18:
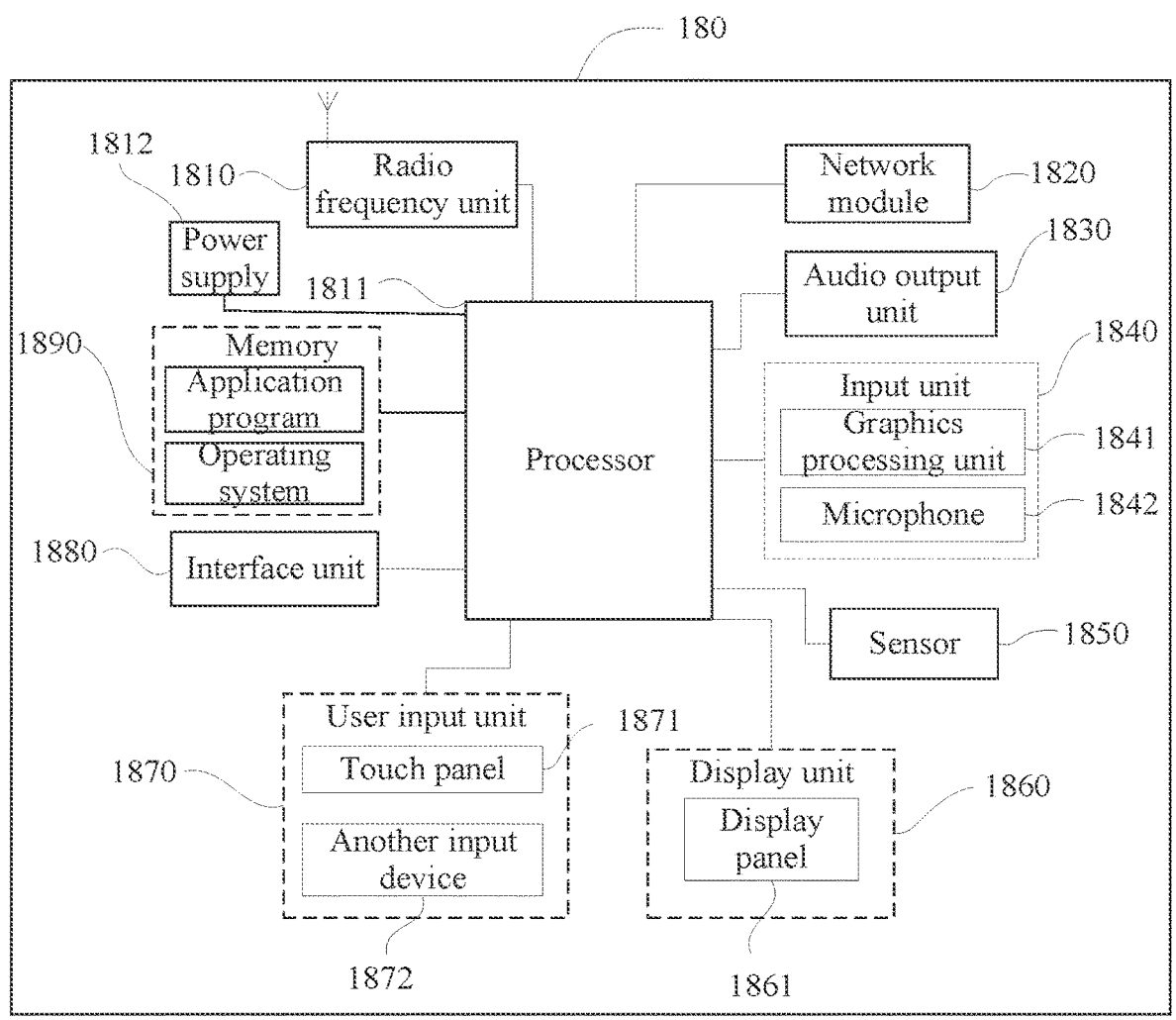
FIG. 18 is a sixth schematic structural diagram of a terminal according to an embodiment of the present disclosure.

FIG. 18 is a schematic diagram of a hardware structure of a terminal according to an embodiment of the present disclosure.

A terminal 180 includes but is not limited to components such as a radio frequency unit 1810, a network module 1820, an audio output unit 1830, an input unit 1840, a sensor 1850, a display unit 1860, a user input unit 1870, an interface unit 1880, a memory 1890, a processor 1811, and a power supply 1812. It can be understood by a person skilled in the art that, the terminal structure shown in FIG. 18 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The processor 1811 is configured to: receive configuration information that is associated with a beam report and that is sent by a network node; and report a beam report to the network node according to the configuration information, where the beam report carries a timing advance TA value.

According to the terminal in this embodiment of the present disclosure, configuration information that is associated with a beam report and that is sent by a network node is received; and a beam report is reported to the network node according to the configuration information, where the beam report carries a timing advance TA value. In this way, a network can quickly obtain TA information of UE and different cells, so that a problem in the prior art that the network cannot quickly obtain TA information of UE and different cells can be resolved.

It should be understood that, in this embodiment of the present disclosure, the radio frequency unit 1810 may be configured to receive and send information or a signal in a call process. In some embodiments, after receiving downlink data from a network node, the radio frequency unit 1810 sends the downlink data to the processor 1811 for processing. In addition, the radio frequency unit 1810 sends uplink data to the network node. Usually, the radio frequency unit 1810 includes but is not limited to an antenna, at least one amplifier, a transceiver, a coupler, a low noise amplifier, a duplexer, and the like. In addition, the radio frequency unit 1810 may communicate with a network and another device through a wireless communication system.

The terminal provides wireless broadband Internet access for the user by using the network module 1820, for example, helping the user to send and receive an e-mail, brows a web page, and access streaming media.

The audio output unit 1830 may convert audio data received by the radio frequency unit 1810 or the network module 1820 or stored in the memory 1890 into an audio signal and output the audio signal as a sound. In addition, the audio output unit 1830 may further provide an audio output (for example, a call signal received voice, or a message received voice) related to a specific function implemented by the terminal 180. The audio output unit 1830 includes a speaker, a buzzer, a telephone receiver, and the like.

The input unit 1840 is configured to receive an audio signal or a video signal. The input unit 1840 may include a GPU 1841 and a microphone 1842, and the graphics processing unit 1841 processes image data of a still picture or video obtained by an image capture apparatus (such as a camera) in a video capture mode or an image capture mode. A processed image frame may be displayed on the display unit 1860. The image frame processed by the graphics processing unit 1841 may be stored in the memory 1890 (or another storage medium) or sent by using the radio frequency unit 1810 or the network module 1820. The microphone 1842 may receive a sound and can process such sound into audio data. Processed audio data may be converted, in a call mode, into a format that can be sent to a mobile communication network node by using the radio frequency unit 1810 for output.

The terminal 180 further includes at least one type of sensor 1850, such as a light sensor, a motion sensor, and another sensor. In some embodiments, the light sensor includes an ambient light sensor and a proximity sensor. The ambient light sensor may adjust luminance of the display panel 1861 based on brightness of ambient light. The proximity sensor may turn off the display panel 1861 and/or backlight when the terminal 180 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 1850 may further include a fingerprint sensor, a pressure sensor, an iris sensor, a molecular sensor, a gyroscope, a barometer, a hygrometer, a thermometer, an infrared sensor, and the like. Details are not described herein.

The display unit 1860 is configured to display information entered by a user or information provided for a user. The display unit 1860 may include a display panel 1861. The display panel 1861 may be configured in a form of LCD, an OLED, or the like.

The user input unit 1870 may be configured to receive input numeral or character information, and generate key signal input related to user setting and functional control of the terminal. In some embodiments, the user input unit 1870 includes a touch panel 1871 and another input device 1872. The touch panel 1871 is also referred to as a touchscreen, and may collect a touch operation performed by a user on or near the touch panel 1871 (such as an operation performed by a user on the touch panel 1871 or near the touch panel 1871 by using any proper object or accessory, such as a finger or a stylus). The touch panel 1871 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 1811, and can receive and execute a command sent by the processor 1811. In addition, the touch panel 1871 may be of a resistive type, a capacitive type, an infrared type, a surface acoustic wave type, or the like. The user input unit 1870 may include another input device 1872 in addition to the touch panel 1871. In some embodiments, the another input device 1872 may include but is not limited to a physical keyboard, a functional button (such as a volume control button or a power on/off button), a trackball, a mouse, and a joystick. Details are not described herein.

Further, the touch panel 1871 may cover the display panel 1861. When detecting the touch operation on or near the touch panel 1871, the touch panel 1871 transmits the touch operation to the processor 1811 to determine a type of a touch event, and then the processor 1811 provides corresponding visual output on the display panel 1861 based on the type of the touch event. In FIG. 18, although the touch panel 1871 and the display panel 1861 are used as two independent parts to implement input and output functions of the terminal, in some embodiments, the touch panel 1871 and the display panel 1861 may be integrated to implement the input and output functions of the terminal. This is not specifically limited herein.

The interface unit 1880 is an interface for connecting an external apparatus with the terminal 180. For example, the external apparatus may include a wired or wireless headphone port, an external power supply (or a battery charger) port, a wired or wireless data port, a storage card port, a port used to connect to an apparatus having an identity module, an audio I/O port, a video I/O port, a headset port, and the like. The interface unit 1880 may be configured to receive input (for example, data information and power) from an external apparatus and transmit the received input to one or more elements in the terminal 180 or may be configured to transmit data between the terminal 180 and an external apparatus.

The memory 1890 may be configured to store a software program and various data. The memory 1890 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1890 may include a high-speed random access memory, and may further include a nonvolatile memory, for example, at least one magnetic disk storage device, a flash storage device, or another volatile solid-state storage device.

The processor 1811 is a control center of the terminal, and connects all parts of the entire terminal by using various interfaces and lines. By running or executing a software program and/or a module stored in the memory 1890 and invoking data stored in the memory 1890, the processor 1811 performs various functions of the terminal and data processing, to perform overall monitoring on the terminal. In some embodiments, the processor 1811 may include one or more processing units. In some embodiments, an application processor and a modem processor may be integrated into the processor 1811. The application processor mainly processes an operating system, a user interface, an application, and the like. The modem processor mainly processes wireless communications. It can be understood that, in some embodiments, the modem processor may not be integrated into the processor 1811.

The terminal 180 may further include the power supply 1812 (such as a battery) that supplies power to each component. In some embodiments, the power supply 1812 may be logically connected to the processor 1811 by using a power management system, so as to implement functions such as charging, discharging, and power consumption management by using the power management system.

In addition, the terminal 180 includes some function modules not shown, and details are not described herein.

For example, an embodiment of the present disclosure further provides a terminal, including a processor 1811, a memory 1890, and a computer program that is stored in the memory 1890 and that can be run on the processor 1811. When the computer program is executed by the processor 1811, the foregoing processes of the beam reporting method embodiment applied to the terminal side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the beam reporting method embodiment applied to the terminal side are implemented and a same technical effect can be achieved. To avoid repetition, details are not described herein again. The computer-readable storage medium includes a ROM, a RAM, a magnetic disk, or an optical disc.

The foregoing descriptions are merely implementations of the present disclosure. It should be noted that a person of ordinary skill in the art may make several improvements and polishing without departing from the principle of the present disclosure and the improvements and polishing shall fall within the protection scope of the present disclosure.

The invention claimed is:

1. A beam reporting method, performed by a network node, comprising:
    sending configuration information associated with a beam report to a terminal; and
    receiving the beam report reported by the terminal in response to the configuration information, wherein the beam report carries a Timing Advance (TA) value,
    wherein a layer 1 beam report in the beam report carries a TA value, wherein the layer 1 beam report is associated with a neighbor network node, or the configuration information is associated with the neighbor network node; and
    in the configuration information, at least one of identifier information or identifier related information of the neighbor network node is processed in at least one of the following manners:
    being configured by the network node;
    being activated by the network node; or
    being updated by the network node,
    wherein the layer 1 beam report carries at least one of identifier information or identifier related information of the network node.

2. The beam reporting method according to claim 1, wherein at least one of a layer 3 beam report or a higher layer report in the beam report carries a TA value in a case of dual connectivity.

3. The beam reporting method according to claim 1, wherein in the configuration information, configured third signaling is enabled or disabled, or third signaling is configured or third signaling is not configured.

4. The beam reporting method according to claim 1, wherein that the beam report carries the TA value further comprises:
    the beam report carries at least one of timing or a TA value of a neighbor network node.

5. The beam reporting method according to claim 4, wherein a value range corresponding to the TA value or the difference is indicated by a first bit group, and a value indicated by the first bit group is a default value or is configured by a network; and
    the first bit group comprises at least one bit.

6. The beam reporting method according to claim 4, wherein the TA value or the difference is reported only when at least one of the following reporting conditions is met:
    the TA value or the difference is less than a first threshold;
    the TA value or the difference is greater than a second threshold; or
    the TA value or the difference is greater than a third threshold and less than a fourth threshold, wherein specific values of the first threshold, the second threshold, the third threshold, and the fourth threshold, and a specific reporting condition of the TA value or the difference value are determined through default setting or a network configuration, or determined by the terminal.

7. The beam reporting method according to claim 1, wherein the TA value is reported together with at least one of the following information:
    at least one of a reference signal identifier and beam quality;
    at least one of identifier information and identifier related information of a network node; or
    at least one of identifier information and identifier related information of an antenna panel.

8. A beam reporting method, performed by a terminal, comprising:
    receiving configuration information that is associated with a beam report and that is sent by a network node; and
    reporting a beam report to the network node in response to the configuration information, wherein the beam report carries a Timing Advance (TA) value,
    wherein a layer 1 beam report in the beam report carries a TA value, wherein the layer 1 beam report is associated with a neighbor network node, or the configuration information is associated with the neighbor network node; and
    in the configuration information, at least one of identifier information or identifier related information of the neighbor network node is processed in at least one of the following manners:
    being configured by the network node;
    being activated by the network node; or
    being updated by the network node,
    wherein the layer 1 beam report carries at least one of identifier information or identifier related information of the network node.

9. The beam reporting method according to claim 8, wherein at least one of a layer 3 beam report or a higher layer report in the beam report carries a TA value in a case of dual connectivity.

10. The beam reporting method according to claim 8, wherein in the configuration information, configured third signaling is enabled or disabled, or third signaling is configured or third signaling is not configured.

11. The beam reporting method according to claim 8, wherein that the beam report carries the TA value further comprises:
    the beam report carries at least one of timing or a TA value of a neighbor network node.

12. The beam reporting method according to claim 11, wherein a value range corresponding to the TA value or the difference is indicated by a first bit group, and a value indicated by the first bit group is a default value or is configured by a network; and
    the first bit group comprises at least one bit.

13. The beam reporting method according to claim 11, wherein the TA value or the difference is reported only when at least one of the following reporting conditions is met:
- the TA value or the difference is less than a first threshold;
- the TA value or the difference is greater than a second threshold; or
- the TA value or the difference is greater than a third threshold and less than a fourth threshold, wherein specific values of the first threshold, the second threshold, the third threshold, and the fourth threshold, and a specific reporting condition of the TA value or the difference value are determined through default setting or a network configuration, or determined by the terminal.

14. The beam reporting method according to claim 8, wherein the TA value is reported together with at least one of the following information:
- at least one of a reference signal identifier and beam quality;
- at least one of identifier information and identifier related information of a network node; or
- at least one of identifier information and identifier related information of an antenna panel.

15. A network node, comprising:
a memory storing computer-readable instructions; and
a processor coupled to the memory and configured to execute the computer-readable instructions, wherein the computer-readable instructions, when executed by the processor, cause the processor to perform operations comprising:
sending configuration information associated with a beam report to a terminal; and
receiving a beam report reported by the terminal in response to the configuration information, wherein the beam report carries a Timing Advance (TA) value,
wherein a layer 1 beam report in the beam report carries a TA value, wherein the layer 1 beam report is associated with a neighbor network node, or the configuration information is associated with the neighbor network node; and
in the configuration information, at least one of identifier information or identifier related information of the neighbor network node is processed in at least one of the following manners:
being configured by the network node;
being activated by the network node; or
being updated by the network node,
wherein the layer 1 beam report carries at least one of identifier information or identifier related information of the network node.

16. A terminal, comprising:
a memory storing computer-readable instructions; and
a processor coupled to the memory and configured to execute the computer-readable instructions, wherein the computer-readable instructions, when executed by the processor, cause the processor to perform operations comprising:
receiving configuration information that is associated with a beam report and that is sent by a network node; and
reporting a beam report to the network node in response to the configuration information, wherein
the beam report carries a Timing Advance (TA) value,
wherein a layer 1 beam report in the beam report carries a TA value, wherein the layer 1 beam report is associated with a neighbor network node, or the configuration information is associated with the neighbor network node; and
in the configuration information, at least one of identifier information or identifier related information of the neighbor network node is processed in at least one of the following manners:
being configured by the network node;
being activated by the network node; or
being updated by the network node,
wherein the layer 1 beam report carries at least one of identifier information or identifier related information of the network node.

17. The terminal according to claim 16, wherein at least one of a layer 3 beam report or a higher layer report in the beam report carries a TA value in a case of dual connectivity.

* * * * *